(12) United States Patent
Sandorfi et al.

(10) Patent No.: US 8,938,595 B2
(45) Date of Patent: Jan. 20, 2015

(54) EMULATED STORAGE SYSTEM

(75) Inventors: Miklos Sandorfi, Northborough, MA (US); Timmie G. Reiter, Westborough, MA (US)

(73) Assignee: Sepaton, Inc., Marlborough, MA (US)

( * ) Notice: Subject to any disclaimer, the term of this patent is extended or adjusted under 35 U.S.C. 154(b) by 339 days.

(21) Appl. No.: 11/771,245

(22) Filed: Jun. 29, 2007

(65) Prior Publication Data
US 2008/0016131 A1    Jan. 17, 2008

Related U.S. Application Data

(63) Continuation-in-part of application No. 11/593,266, filed on Nov. 6, 2006, now Pat. No. 7,430,647, which is a continuation of application No. 10/911,987, filed on Aug. 5, 2004, now Pat. No. 7,146,476.

(60) Provisional application No. 60/492,576, filed on Aug. 5, 2003, provisional application No. 60/492,827, filed on Aug. 6, 2003.

(51) Int. Cl.
*G06F 12/00* (2006.01)
*G06F 11/14* (2006.01)
*G06F 12/02* (2006.01)

(52) U.S. Cl.
CPC ........ *G06F 11/1451* (2013.01); *G06F 11/1458* (2013.01); *G06F 12/02* (2013.01); *G06F 11/1453* (2013.01)
USPC ........... 711/162; 711/147; 711/112; 711/165; 711/167

(58) Field of Classification Search
CPC .... G06F 12/02; G06F 12/0871; G06F 12/123
See application file for complete search history.

(56) References Cited

U.S. PATENT DOCUMENTS

| | | | |
|---|---|---|---|
| 5,226,141 A | 7/1993 | Esbensen | |
| 5,276,860 A | 1/1994 | Fortier et al. | |
| 5,276,867 A * | 1/1994 | Kenley et al. | ............... 707/204 |
| 5,403,639 A | 4/1995 | Belsan et al. | |
| 5,454,098 A | 9/1995 | Pisello et al. | |
| 5,990,810 A | 11/1999 | Williams | |
| 5,991,862 A | 11/1999 | Ruane | |
| 6,070,224 A | 5/2000 | LeCrone et al. | |

(Continued)

FOREIGN PATENT DOCUMENTS

| | | |
|---|---|---|
| CN | 1092886 | 9/1994 |
| EP | 0774715 A | 5/1997 |

(Continued)

OTHER PUBLICATIONS

International Search Report from corresponding International Application No. PCT/US2008/068528, dated Nov. 25, 2008.

(Continued)

*Primary Examiner* — Aimee Li
*Assistant Examiner* — Arvind Talukdar
(74) *Attorney, Agent, or Firm* — Lando & Anastasi, LLP

(57) ABSTRACT

A method for removing redundant data from a backup storage system is presented. In one example, the method may include identifying a first back-up data object, identifying a second back-up data object, detecting a first portion of the first back-up data object that is a copy of a second portion of the second back-up data object, and replacing the second portion with a pointer to the first portion.

23 Claims, 12 Drawing Sheets

(56) References Cited

U.S. PATENT DOCUMENTS

| | | | |
|---|---|---|---|
| 6,098,148 A | 8/2000 | Carlson | |
| 6,101,472 A | 8/2000 | Giangarra et al. | |
| 6,230,190 B1 | 5/2001 | Edmonds et al. | |
| 6,247,024 B1 | 6/2001 | Kincaid | |
| 6,317,814 B1 | 11/2001 | Blendermann et al. | |
| 6,366,986 B1 | 4/2002 | St. Pierre et al. | |
| 6,366,987 B1 | 4/2002 | Tzelnic et al. | |
| 6,385,706 B1 | 5/2002 | Ofek et al. | |
| 6,477,544 B1 * | 11/2002 | Bolosky et al. | 1/1 |
| 6,542,906 B2 | 4/2003 | Korn | |
| 6,714,952 B2 | 3/2004 | Dunham et al. | |
| 6,715,098 B2 | 3/2004 | Cheng et al. | |
| 6,718,352 B1 | 4/2004 | Dang et al. | |
| 6,779,095 B2 * | 8/2004 | Selkirk et al. | 711/165 |
| 6,829,617 B2 | 12/2004 | Sawdon et al. | |
| 6,925,525 B2 | 8/2005 | Blendermann et al. | |
| 7,024,427 B2 | 4/2006 | Bobbitt et al. | |
| 7,043,727 B2 | 5/2006 | Bennett et al. | |
| 7,055,008 B2 | 5/2006 | Niles et al. | |
| 7,058,788 B2 | 6/2006 | Niles et al. | |
| 7,065,619 B1 | 6/2006 | Zhu et al. | |
| 7,093,127 B2 | 8/2006 | McNulty | |
| 7,116,249 B2 | 10/2006 | McCanne et al. | |
| 7,120,631 B1 | 10/2006 | Vahalia et al. | |
| 7,146,475 B2 | 12/2006 | Perego | |
| 7,146,476 B2 | 12/2006 | Sandorfi et al. | |
| 7,155,585 B2 | 12/2006 | Lam et al. | |
| 7,165,145 B2 | 1/2007 | Lam | |
| 7,181,373 B2 | 2/2007 | Le Cocq et al. | |
| 7,216,135 B2 | 5/2007 | Sawdon et al. | |
| 7,373,603 B1 | 5/2008 | Yalovsky et al. | |
| 7,430,647 B2 | 9/2008 | Sandorfi et al. | |
| 7,472,242 B1 * | 12/2008 | Deshmukh et al. | 711/162 |
| 7,555,755 B2 | 6/2009 | Fairweather | |
| 7,885,972 B2 | 2/2011 | Pragada et al. | |
| 7,941,440 B2 | 5/2011 | Pragada | |
| 8,078,634 B2 | 12/2011 | Pragada et al. | |
| 8,121,993 B2 | 2/2012 | Blount et al. | |
| 8,140,821 B1 | 3/2012 | Raizen et al. | |
| 8,156,306 B1 | 4/2012 | Raizen et al. | |
| 8,214,392 B2 | 7/2012 | Pragada et al. | |
| 8,285,690 B2 | 10/2012 | Nakamura et al. | |
| 2002/0059505 A1 | 5/2002 | St. Pierre et al. | |
| 2002/0091710 A1 | 7/2002 | Dunham et al. | |
| 2002/0124137 A1 | 9/2002 | Ulrich et al. | |
| 2003/0014462 A1 | 1/2003 | Bennett et al. | |
| 2003/0028718 A1 | 2/2003 | Blendermann et al. | |
| 2003/0074378 A1 | 4/2003 | Midgley et al. | |
| 2003/0105912 A1 | 6/2003 | Noren | |
| 2003/0135514 A1 | 7/2003 | Patel et al. | |
| 2003/0145180 A1 | 7/2003 | McNeil | |
| 2003/0145248 A1 | 7/2003 | McNeil | |
| 2003/0158831 A1 | 8/2003 | Zaremba | |
| 2003/0177417 A1 | 9/2003 | Coombs | |
| 2003/0221076 A1 | 11/2003 | Milligan et al. | |
| 2003/0225800 A1 * | 12/2003 | Kavuri | 707/204 |
| 2004/0073582 A1 * | 4/2004 | Spiegel | 707/204 |
| 2004/0088507 A1 | 5/2004 | Satoyama et al. | |
| 2005/0010730 A1 | 1/2005 | Kano | |
| 2005/0108486 A1 | 5/2005 | Sandorfi et al. | |
| 2005/0193235 A1 | 9/2005 | Sandorfi et al. | |
| 2006/0048002 A1 * | 3/2006 | Kodi et al. | 714/13 |
| 2006/0059207 A1 | 3/2006 | Hirsch et al. | |
| 2006/0064444 A1 | 3/2006 | Van Ingen et al. | |
| 2007/0101074 A1 | 5/2007 | Patterson | |
| 2007/0112896 A1 | 5/2007 | Sandorfi et al. | |
| 2007/0255758 A1 | 11/2007 | Zheng et al. | |
| 2007/0266059 A1 | 11/2007 | Kitamura | |
| 2008/0016131 A1 | 1/2008 | Sandorfi | |
| 2008/0028007 A1 * | 1/2008 | Ishii et al. | 707/204 |
| 2008/0034017 A1 * | 2/2008 | Giampaolo et al. | 707/204 |
| 2008/0082310 A1 | 4/2008 | Sandorfi et al. | |
| 2008/0184001 A1 | 7/2008 | Stager | |
| 2008/0275866 A1 | 11/2008 | Pragada et al. | |
| 2008/0275911 A1 | 11/2008 | Sandorfi | |
| 2008/0283127 A1 | 11/2008 | Wang et al. | |
| 2008/0301134 A1 | 12/2008 | Miller et al. | |
| 2009/0172326 A1 | 7/2009 | Sandorfi | |
| 2009/0182789 A1 | 7/2009 | Sandorfi | |
| 2009/0193219 A1 | 7/2009 | Ohira et al. | |
| 2009/0300321 A1 | 12/2009 | Balachandran et al. | |
| 2009/0307251 A1 | 12/2009 | Heller et al. | |
| 2010/0017487 A1 | 1/2010 | Patinkin | |
| 2010/0088296 A1 | 4/2010 | Periyagaram et al. | |
| 2010/0095158 A1 | 4/2010 | Shah-Hosseini | |
| 2010/0188273 A1 | 7/2010 | He et al. | |
| 2010/0198797 A1 | 8/2010 | Wideman | |
| 2011/0016095 A1 | 1/2011 | Anglin et al. | |
| 2011/0022989 A1 | 1/2011 | Lin et al. | |
| 2011/0072017 A1 | 3/2011 | Pragada | |
| 2011/0093501 A1 | 4/2011 | Pragada et al. | |
| 2011/0099200 A1 | 4/2011 | Blount et al. | |
| 2011/0145253 A1 | 6/2011 | Pragada et al. | |
| 2011/0145254 A1 | 6/2011 | Pragada et al. | |
| 2011/0184921 A1 | 7/2011 | Reiter et al. | |
| 2011/0184966 A1 | 7/2011 | Reiter et al. | |
| 2011/0184967 A1 | 7/2011 | Reiter et al. | |
| 2011/0185133 A1 | 7/2011 | Reiter et al. | |
| 2011/0273982 A1 | 11/2011 | Akirav et al. | |
| 2011/0307447 A1 | 12/2011 | Sabaa et al. | |
| 2012/0089574 A1 | 4/2012 | Doerner | |
| 2012/0150954 A1 | 6/2012 | Tofano | |
| 2012/0166448 A1 | 6/2012 | Li et al. | |
| 2012/0191669 A1 | 7/2012 | Kennedy et al. | |
| 2012/0191670 A1 | 7/2012 | Kennedy et al. | |
| 2013/0120379 A1 | 5/2013 | Adair et al. | |

FOREIGN PATENT DOCUMENTS

| | | |
|---|---|---|
| WO | 9414125 | 9/1994 |
| WO | 9906912 | 2/1999 |
| WO | 03025795 | 3/2003 |
| WO | 2005017686 | 2/2005 |
| WO | 2005033945 | 4/2005 |

OTHER PUBLICATIONS

International Search Report from International Application No. PCT/US2004/025283, dated Mar. 2, 2005.

International Preliminary Report on Patentability in PCT Application No. PCT/US2004/32122, dated Jun. 15, 2005.

Time Navigator—Backup, archiving and restoration software Nov. 10, 2000, http://www.icewalkers.com/Linux/Software/512830/Time-Navigator.html (retrieved Oct. 20, 2009)—printed Dec. 16, 2009.

Supplementary Euorpean Search Report from European Application No. 04789325 (dated Oct. 20, 2009).

Notification of Transmittal of the International Search Report and the Written Opinion of the International Searching Authority, or the Declaration issued in PCT Application PCT/US04/32122, filed Sep. 30, 2004.

Bhagwat et al. "Extreme Binning: Scalable, Parallel Deduplication for Chunk-based File Backup". originally published in the Proceedings of the 17th IEEE/ACM International Symposium on Modelling, Analysis and Simulation of Computer and Telecommunication Systems, (MASCOTS' 2009) London, UK, Sep. 21-23, 2009.

Meiri et al. "Parallel Compression of Correlated Files". 2007 IEEE International Conference on Cluster Computing. pp. 285-292. Sep. 2007.

Zhu et al. "Avoiding the Disk Bottleneck in the Data Domain Deduplication File System". FAST '08 6th USENIX Conference on File and Storage Technologies. San Jose, CA, Feb. 26-29, 2008.

* cited by examiner

| Type | Size | Block Count |
|---|---|---|
| FM | – | 1 |
| Data | 1024 | 4 |
| Data | 256k | 100,000 |
| FM | – | 1 |
| Data | 1024 | 1 |
| ⋮ | ⋮ | ⋮ |
| ⋮ | ⋮ | ⋮ |

FIG. 6

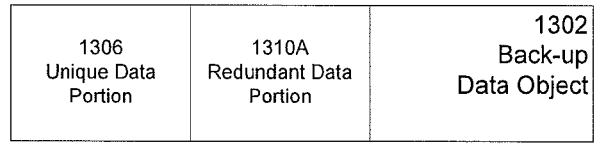
FIG. 13A
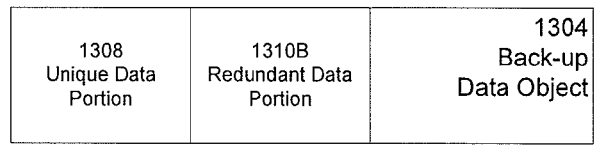
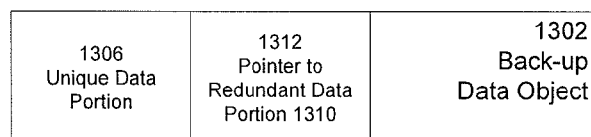
FIG. 13B
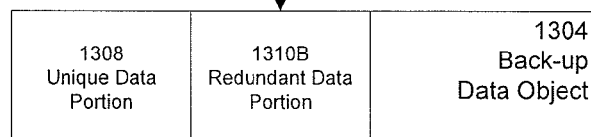
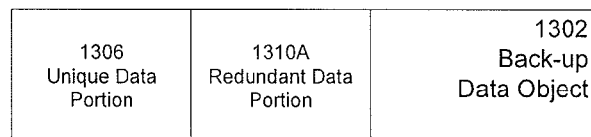
FIG. 13C
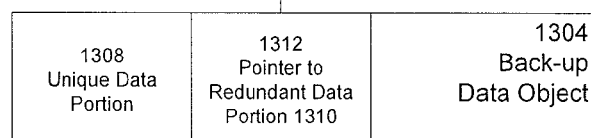

EMULATED STORAGE SYSTEM

RELATED APPLICATIONS

This application is a continuation-in-part of, and claims priority under 35 U.S.C. §120 to, pending U.S. patent application Ser. No. 11/593,266 filed Nov. 6, 2006, entitled "Emulated Storage System," which is a continuation of, and claims priority under 35 U.S.C. §120 to, U.S. patent application Ser. No. 10/911,987, filed Aug. 5, 2004, entitled "Emulated Storage System" and now U.S. Pat. No. 7,146,476, which claims the benefit under 35 U.S.C. §119(e) of U.S. Provisional Application No. 60/492,576, entitled "Synthetic Full Back-up Method," filed on Aug. 5, 2003 and U.S. Provisional Application No. 60/492,827, entitled "End-User File Restore Method," filed on Aug. 6, 2003, each of which is hereby incorporated by reference in its entirety.

BACKGROUND

1. Field of Invention

Aspects of the present invention relate to data storage, and more particularly to apparatus and methods for emulating a tape storage system which can provide the equivalent of full data back-ups using an existing full back-up and subsequent incremental back-ups and enabling end-users to restore data from such back-ups.

2. Discussion of Related Art

Many computer systems include one or more host computers and one or more data storage systems that store data used by the host computers. These host computers and storage systems are typically networked together using a network such as a Fibre Channel network, an Ethernet network, or another type of communication network. Fibre Channel is a standard that combines the speed of channel-based transmission schemes and the flexibility of network-based transmission schemes and allows multiple initiators to communicate with multiple targets over a network, where the initiator and the target may be any device coupled to the network. Fibre Channel is typically implemented using a fast transmission media such as optical fiber cables, and is thus a popular choice for storage system networks where large amounts of data are transferred.

An example of a typical networked computing environment including several host computers and back-up storage systems is shown in FIG. 1. One or more application servers 102 are coupled via a local area network (LAN) 103 to a plurality of user computers 104. Both the application servers 102 and the user computers 104 may be considered "host computers." The application servers 102 are coupled to one or more primary storage devices 106 via a storage area network (SAN) 108. The primary storage devices 106 may be, for example, disk arrays such as are available from companies like EMC Corporation, IBM Corporation and others. Alternatively, a bus (not shown) or other network link may provide an interconnect between the application servers and the primary storage system 106. The bus and/or Fibre Channel network connection may operate using a protocol, such as the Small Component System Interconnect (SCSI) protocol, which dictates a format of packets transferred between the host computers (e.g., the application servers 102) and the storage system(s) 106.

It is to be appreciated that the networked computing environment illustrated in FIG. 1 is typical of a large system as may be used by, for example, a large financial institution or large corporation. It is to be understood that many networked computing environments need not include all the elements illustrated in FIG. 1. For example, a smaller networked computing environment may simply include host computers connected directly, or via a LAN, to a storage system. In addition, although FIG. 1 illustrates separate user computers 104, application servers 102 and media servers 114, these functions may be combined into one or more computers.

In addition to primary storage devices 106, many networked computer environments include at least one secondary or back-up storage system 110. The back-up storage system 110 may typically be a tape library, although other large capacity, reliable secondary storage systems may be used. Typically, these secondary storage systems are slower than the primary storage devices, but include some type of removable media (e.g., tapes, magnetic or optical disks) that may be removed and stored off-site.

In the illustrated example, the application servers 102 may be able to communicate directly with the back-up storage system 110 via, for example, an Ethernet or other communication link 112. However, such a connection may be relatively slow and may also use up resources, such as processor time or network bandwidth. Therefore, a system such as illustrated may include one or more media servers 114 that may provide a communication link 115, using for example, Fibre Channel, between the SAN 108 and the back-up storage system 110.

The media servers 114 may run software that includes a back-up/restore application that controls the transfer of data between host computers (such as user computers 104, the media servers 114, and/or the application servers 102), the primary storage devices 106 and the back-up storage system 110. Examples of back-up/restore applications are available from companies like Veritas, Legato and others. For data protection, data from the various host computers and/or the primary storage devices in a networked computing environment may be periodically backed-up onto the back-up storage system 110 using a back-up/restore application, as is known in the art.

Of course, it is to be appreciated that, as discussed above, many networked computer environments may be smaller and may include fewer components than does the exemplary networked computer environment illustrated in FIG. 1. Therefore, it is also to be appreciated that the media servers 114 may in fact be combined with the application servers 102 in a single host computer, and that the back-up/restore application may be executed on any host computer that is coupled (either directly or indirectly, such as through a network) to the back-up storage system 110.

One example of a typical back-up storage system is a tape library that includes a number of tape cartridges and at least one tape drive, and a robotic mechanism that controls loading and unloading of the cartridges into the tape drives. The back-up/restore application provides instructions to the robotic mechanism to locate a particular tape cartridge, e.g., tape number 0001, and load the tape cartridge into the tape drive so that data may be written onto the tape. The back-up/restore application also controls the format in which data is written onto the tapes. Typically, the back-up/restore application may use SCSI commands, or other standardized commands, to instruct the robotic mechanism and to control the tape drive(s) to write data onto the tapes and to recover previously written data from the tapes.

Conventional tape library back-up systems suffer from a number of problems including speed, reliability and fixed capacity. Many large companies need to back-up Terabytes of data each week. However, even expensive, high-end tapes can usually only read/write data at speeds of 30-40 Megabytes per second (MB/s), which translates to about 50 Gigabyte per hour (GB/hr). Thus, to back-up one or two Terabytes of data to a tape back-up system may take at least 10 to 20 hours of continuous data transfer time.

In addition, most tape manufacturers will not guarantee that it will be possible to store (or restore) data to/from a tape if the tape is dropped (as may happen relatively frequently in a typical tape library because either a human operator or the robotic mechanism may drop a tape during a move or load operation) or if the tape is exposed to non-ideal environmental conditions, such as extremes in temperature or moisture. Therefore, a great deal of care needs to be taken to store tapes in a controlled environment. Furthermore, the complex machinery of a tape library (including the robotic mechanism) is expensive to maintain and individual tape cartridges are relatively expensive and have limited lifespans.

SUMMARY OF INVENTION

Embodiments of the present invention provide a back-up storage system that overcomes or alleviates some or all of the problems of conventional tape library systems and that may provide greater flexibility than do conventional tape library systems.

In broad overview, aspects and embodiments of the present invention provide a random-access based storage system that emulates a conventional tape back-up storage system such that a back-up/restore application sees the same view of devices and media as with a physical tape library. The storage system of the invention uses software and hardware to emulate physical tape media and replace them with one or more random-access disk arrays, translating tape format, linear, sequential data to data that is suitable for storage on disk.

According to some aspects and embodiments of the present invention, there is provided a mechanism for decoding existing back-up data sets and storing the metadata (i.e., data that represents information about user data) in a searchable metadata cache, a mechanism to allow searching and/or viewing of the metadata cache for files or objects, and a mechanism for downloading these files or objects via a web connection from data stored through existing back-up policies and practices of typical back-up software. Also included may be a mechanism for authenticating a user through existing authentication mechanisms, and for limiting the view of the metadata cache based on a current user's credentials.

Aspects and embodiments of the present invention also provide for removal of redundant data from back-up data objects. This removal process, which may be termed "de-duplication," decreases the storage capacity required to maintain copies of back-up data and thus decreases the amount of electronic media required to store back-up data. Embodiments of the de-duplication process in accordance with at least some aspects of the present invention make efficient use of computing resources by using metadata to optimize de-duplication processing, as discussed further below.

According to other aspects and embodiments of the invention, there is provided a mechanism for performing a logical merge of multiple cartridge representations in a metadata cache, and a mechanism for appropriately labeling and bar-coding a newly synthesized cartridge such that it is accepted by back-up/restore software as a valid data set. Also, according to further aspects and embodiments of the invention, there is provided a mechanism for either storing multiple copies of data elements that represent a synthetic cartridge, or for storing only pointers to existing data represented in the metadata cache.

One aspect of the invention is directed toward a method for removing redundant data from a backup storage system that includes identifying a first back-up data object, identifying a second back-up data object, detecting a first portion of the first back-up data object that is a copy of a second portion of the second back-up data object and replacing the second portion with a pointer to the first portion.

In the method, replacing the second portion with the pointer to the first portion may include creating a copy of the second back-up data object excluding the second portion, including a pointer to the first portion and deleting the second back-up data object.

The method may also include validating that the copy of the second back-up data object represents the same data as the second back-up data object. In the method, identifying the second back-up data object may include identifying a second back-up data object that was backed-up less recently than the first back-up data object. In the method, identifying the second back-up data object may include identifying a second back-up data object that was backed-up more recently than the first back-up data object.

The method may also include identifying at least one characteristic of data object metadata. In the method, identifying the first back-up data object may include identifying a first back-up data object associated with data object metadata having the at least one characteristic. Also in the method, identifying the second back-up data object may include identifying a second back-up data object associated with data object metadata having the at least one characteristic.

In the method, identifying at least one characteristic of data object metadata may include identifying a location in primary storage associated with the first back-up data object and identifying a location in primary storage associated with the second back-up data object. In the method, identifying at least one characteristic of data object metadata may include identifying a software application associated with the first back-up data object and identifying a software application associated with the second back-up data object. In the method, identifying at least one characteristic of data object metadata may include identifying a back-up policy associated with the first back-up data object and identifying a back-up policy associated with the second back-up data object.

In the method, identifying at least one characteristic of data object metadata may include identifying at least one characteristic of data object metadata that was stored while the first back-up data object was being backed-up and identifying at least one characteristic of data object metadata that was stored while the second back-up data object was being backed-up. In the method, detecting the first portion of the first back-up data object may include detecting the first portion of the first back-up data object using metadata associated with the first back-up data object and metadata associated with the second back-up data object. In the method detecting the first portion of the first back-up data object using metadata may include detecting the first portion of the first back-up data object using metadata stored in a relational database. In the method, identifying the first back-up data object may include identifying a first data file and identifying the second back-up data object may include identifying a second data file. The method may be executed in a grid computing environment. The method may be executed on a back-up storage system while data is not being backed-up to the back-up storage system.

Another aspect of the invention is directed toward a computer-readable medium having computer-readable signals stored thereon that define instructions that, as a result of being executed by a computer, instruct the computer to identify a first back-up data object, identify a second back-up data object, detect a first portion of the first back-up data object that is a copy of a second portion of the second back-up data object and replace the second portion with a pointer to the first portion.

Another aspect of the invention is directed toward a method that includes identifying a first data object associated with a software application, identifying a second data object associated with the software application, detecting, using a pattern of data distribution associated with the software application, redundant data in both the first data object and the second data object and replacing the redundant data in the first data object with a pointer to the redundant data disposed in the second data object.

Another aspect of the invention is directed toward a computer-readable medium having computer-readable signals stored thereon that define instructions that, as a result of being executed by a computer, instruct the computer to identify a first data object associated with a software application, identify a second data object associated with the software application, detect, using a pattern of data distribution associated with the software application, redundant data in both the first data object and the second data object and replace the redundant data in the first data object with a pointer to the redundant data disposed in the second data object.

Another aspect of the invention is directed toward a system that includes back-up storage media storing a plurality of back-up data objects including a first back-up data object including first data and a second back-up data object including second data and a controller configured to identify any portion of the second data that is the same as any portion of the first data, and to replace an identified portion of the second data with a pointer to a corresponding portion of the first data.

In the system, the controller may be further configured to replace an identified portion of the second data object by creating a copy of the second data object excluding the identified portion and including a pointer to the corresponding portion of the first data.

Another aspect of the invention is directed toward a method that includes identifying at least one characteristic of data object metadata, identifying a first back-up data object associated with data object metadata having the at least one characteristic, identifying a second back-up data object associated with data object metadata having the at least one characteristic, detecting redundant data in both the first back-up data object and the second back-up data object, creating a copy of the second back-up data object excluding at least one instance of the redundant data wherein the copy includes a pointer to the redundant data instead of the excluded as least one instance of the redundant data and deleting the second back-up data object.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures:

FIG. 6 is one example of a tape directory structure according to aspects of the invention;

FIG. 13A is a diagram of two back-up data objects;

FIG. 13B is a diagram of de-duplicated copies of the back-up data objects depicted in FIG. 13A; and FIG. 13C is another diagram of de-duplicated copies of the back-up data objects depicted in FIG. 13A.

DETAILED DESCRIPTION

Figure 1:
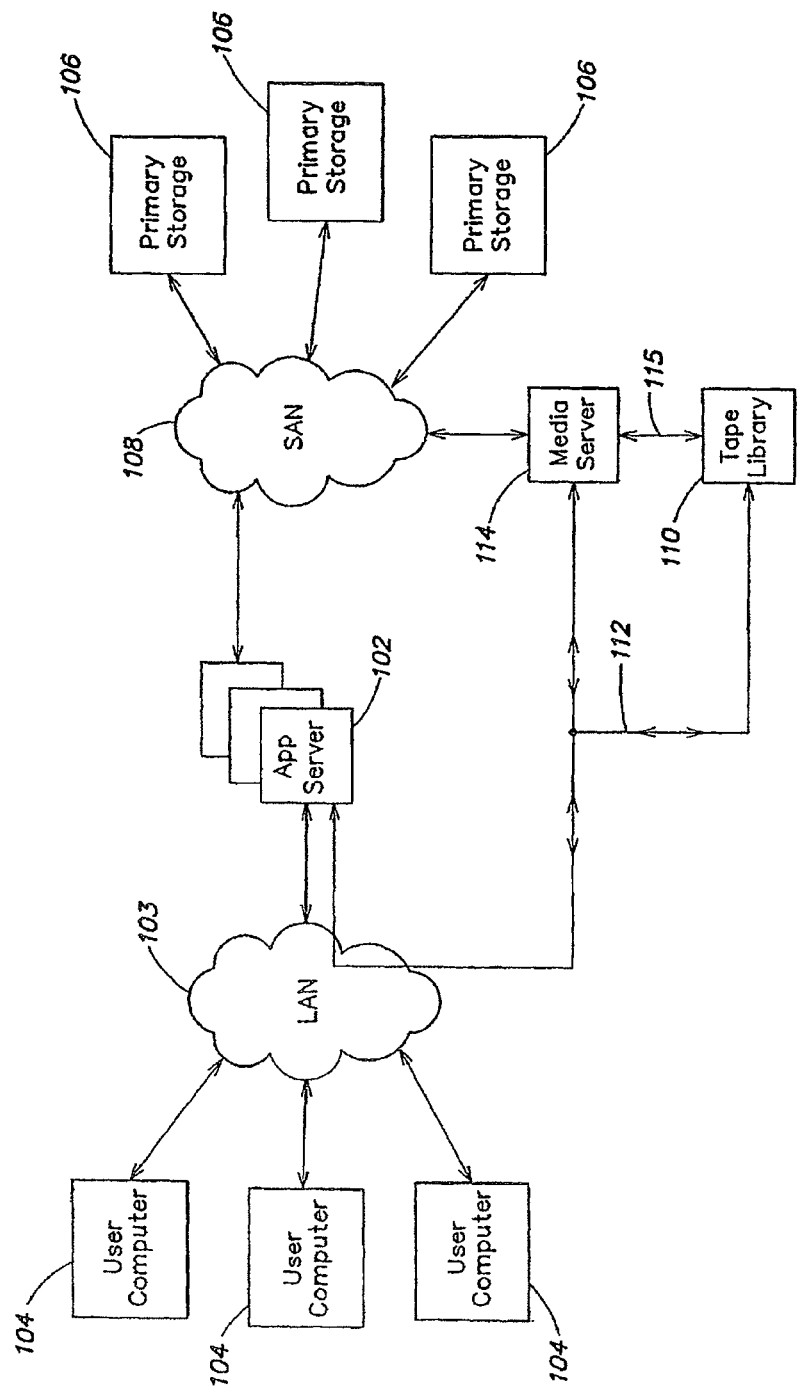
FIG. 1 is a block diagram of one example of a large-scale networked computing environment that includes a back-up storage system.

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As used herein, the term "host computer" refers to any computer that has at least one processor, such as a personal computer, a workstation, a mainframe, a networked client, a server, etc. that is capable of communication with other devices, such as a storage system or other host computers.

Host computers may include media servers and application servers (as described previously with reference to FIG. 1) as well as user computers (which may be user workstations, PCs, mainframes, etc.). In addition, within this disclosure, the term "networked computer environment" includes any computing environment in which a plurality of host computers are connected to one or more shared storage systems in such a manner that the storage system(s) can communicate with each of the host computers. Fibre Channel is one example of a communication network that may be used with embodiments of the present invention. However, it is to be appreciated that the networks described herein are not limited to Fibre Channel, and that the various network components may communicate with each other over any network connection, such as Token Ring or Ethernet instead of, or in addition to Fibre Channel, or over combinations of different network connections. Moreover, aspects of the present invention may also be used in bus topologies, such as SCSI or parallel SCSI.

According to various embodiments and aspects of the present invention, there is provided a virtual removable media library back-up storage system that may use one or more disk arrays to emulate a removable media based storage system. Using embodiments of the invention, data may be backed-up onto the disk array(s) using the same back-up/restore application as would have been used to back-up the data onto removable media (such as tapes, magnetic disks, optical disks, etc.), without a user having to make any modifications or adjustments to the existing back-up procedures or having to purchase a new back-up/restore application. In one embodiment, described in detail herein, the removable media that are emulated are tapes, and the back-up storage system of the invention emulates a tape library system including tapes and the robotic mechanism used to handle tapes in a conventional tape library system.

The data that may be backed-up and restored using embodiments of the invention may be organized into various data objects. These data objects may include any structure into which data may be stored. A non-limiting list of exemplary data objects includes bits, bytes, data files, data blocks, data directories, back-up data sets and virtual cartridges, which are discussed further below. Although the bulk of this disclosure refers to back-up and restore of data files, embodiments of the invention may manipulate any data object and it is to be appreciated that the term "data file" is interchangeable with "data object."

A storage system according to aspects of the invention includes hardware and software that together interface with a host computer (running the back-up/restore application) and a back-up storage media. The storage system may be designed to emulate tapes, or other types of removable storage media, such that the back-up/restore application sees the same view of devices and media as with a physical tape library, and to translate linear, sequential, tape format data into data that is suitable for storage on random-access disks. In this manner, the storage system of the invention may provide enhanced functionality (such as, allowing users to search for individual back-up user files, as discussed below) without requiring new back-up/restore application software or policies.

Figure 2:
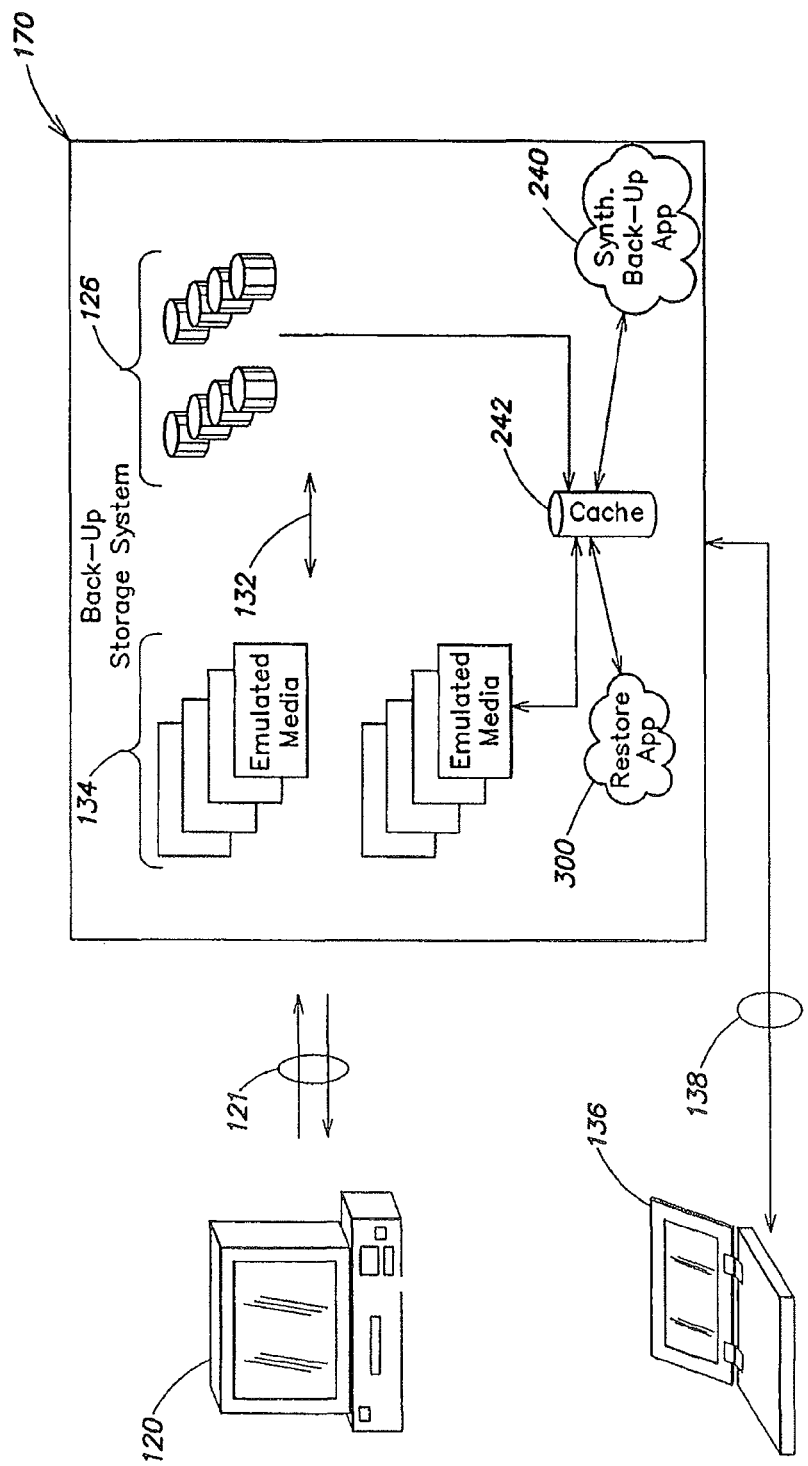
FIG. 2 is a block diagram of one embodiment of a networked computing environment including a storage system according to aspects of the invention.

Referring to FIG. 2, there is illustrated in block diagram form, one embodiment of a networked computing environment including a back-up storage system 170 according to aspects of the invention. As illustrated, a host computer 120 is coupled to the storage system 170 via a network connection 121. This network connection 121 may be, for example a Fibre Channel connection to allow high-speed transfer of data between the host computer 120 and the storage system 170. It is to be appreciated that the host computer 120 may be, or may include, one or more application servers 102 (see FIG. 1) and/or media servers 114 (see FIG. 1) and may enable back-up of data from either any of the computers present in the networked computing environment or from a primary storage device 106 (see FIG. 1). In addition, one or more user computers 136 may also be coupled to the storage system 170 via another network connection 138, such as an Ethernet connection. As discussed in detail below, the storage system may enable users of the user computer 136 to view and optionally restore back-up user files from the storage system.

The storage system includes back-up storage media 126 that may be, for example, one or more disk arrays, as discussed in more detail below. The back-up storage media 126 provide the actual storage space for back-up data from the host computer(s) 120. However, the storage system 170 may also include software and additional hardware that emulates a removable media storage system, such as a tape library, such that, to the back-up/restore application running on the host computer 120, it appears as though data is being backed-up onto conventional removable storage media. Thus, as illustrated in FIG. 2, the storage system 170 may include "emulated media" 134 which represent, for example, virtual or emulated removable storage media such as tapes. These "emulated media" 134 are presented to the host computer by the storage system software and/or hardware and appear to the host computer 120 as physical storage media. Further interfacing between the emulated media 134 and the actual back-up storage media 126 may be a storage system controller (not shown) and a switching network 132 that accepts the data from the host computer 120 and stores the data on the back-up storage media 126, as discussed more fully in detail below. In this manner, the storage system "emulates" a conventional tape storage system to the host computer 120.

According to one embodiment, the storage system may include a "logical metadata cache" 242 that stores metadata relating to user data that is backed-up from the host computer 120 onto the storage system 170. As used herein, the term "metadata" refers to data that represents information about user data and describes attributes of actual user data. A non-limiting exemplary list of metadata regarding data objects may include data object size, logical and/or physical location of the data object in primary storage, the creation date of the data object, the date of the last modification of the data object, the back-up policy name under which the data objected was stored, an identifier, e.g. a name or watermark, of the data object and the data type of the data object, e.g. a software application associated with the data object. The logical metadata cache 242 represents a searchable collection of data that enables users and/or software applications to randomly locate back-up user files, compare user files with one another, and otherwise access and manipulate back-up user files. Two examples of software applications that may use the data stored in the logical metadata cache 242 include a synthetic full back-up application 240 and an end-user restore application 300 that are discussed more fully below.

In brief overview, the synthetic full back-up application 240 is capable of creating a synthetic full back-up data set from one existing full back-up data set and one or more incremental back-up data sets. The synthetic full backup may obviate the need to perform periodic (e.g., weekly) full back-ups, thereby saving considerable time and network resources. Details of the synthetic full back-up application 240 are described further below. The end-user restore application 300, also described more fully in detail below, enables end-users (e.g., operators of the user computers 136) to browse, locate, view and/or restore previously backed-up user files from the storage system 170.

As discussed above, the storage system 170 includes hardware and software that interface with the host computer 120 and the back-up storage media 126. Together, the hardware and software of embodiments of the invention may emulate a conventional tape library back-up system such that, from the point of view of the host computer 120, data appears to be backed-up onto tape, but is in fact backed-up onto another storage medium, such as, for example, a plurality of disk arrays.

Figure 3:
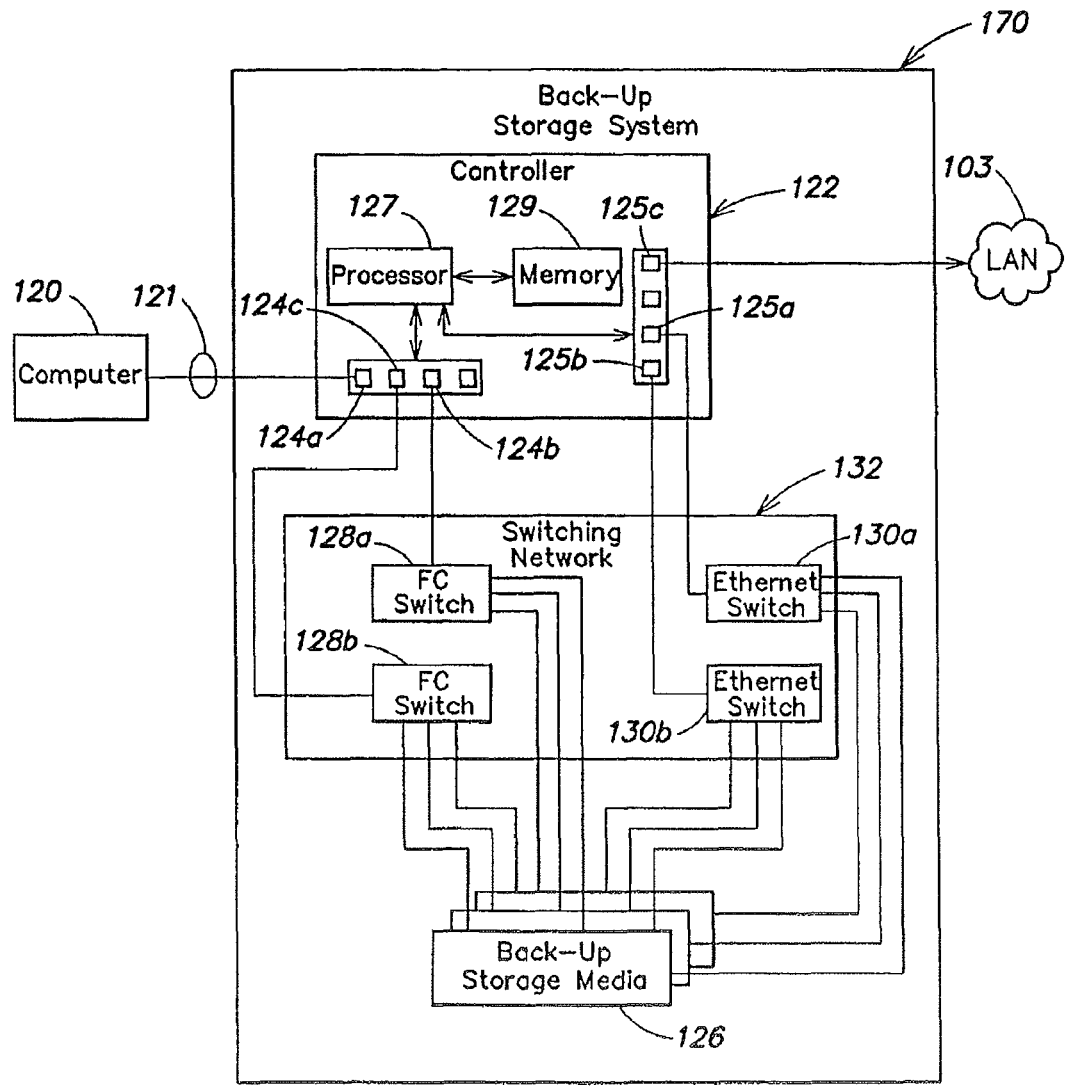
FIG. 3 is a block diagram of one embodiment of a storage system according to aspects of the invention.

Referring to FIG. 3, there is illustrated in block diagram form, one embodiment of a storage system 170 according to aspects of the invention. In one example, the hardware of the storage system 170 includes a storage system controller 122 and a switching network 132 that connects the storage system controller 122 to the back-up storage media 126. The storage system controller 122 includes a processor 127 (which may be a single processor or multiple processors) and a memory 129 (such as RAM, ROM, PROM, EEPROM, Flash memory, etc. or combinations thereof) that may run all or some of the storage system software. The memory 129 may also be used to store metadata relating to the data stored on the back-up storage media 126. Software, including programming code that implements embodiments of the present invention, is generally stored on a computer readable and/or writeable nonvolatile recording medium, such as RAM, ROM, optical or magnetic disk or tape, etc., and then copied into memory 129 wherein it may then be executed by the processor 127. Such programming code may be written in any of a plurality of programming languages, for example, Java, Visual Basic, C, C#, or C++, Fortran, Pascal, Eiffel, Basic, COBAL, or combinations thereof, as the present invention is not limited to a particular programming language. Typically, in operation, the processor 127 causes data, such as code that implements embodiments of the present invention, to be read from a nonvolatile recording medium into another form of memory, such as RAM, that allows for faster access to the information by the processor than does the nonvolatile recording medium.

As shown in FIG. 3, the controller 122 also includes a number of port adapters that connect the controller 122 to the host computer 120 and to the switching network 132. As illustrated, the host computer 120 is coupled to the storage system via a port adapter 124a, which may be, for example, a Fibre Channel port adapter. Via a storage system controller 122, the host computer 120 backs up data onto the back-up storage media 126 and can recover data from the back-up storage media 126.

In the illustrated example, the switching network 132 may include one or more Fibre Channel switches 128a, 128b. The storage system controller 122 includes a plurality of Fibre Channel port adapters 124b and 124c to couple the storage system controller to the Fibre Channel switches 128a, 128b. Via the Fibre Channel switches 128a, 128b, the storage system controller 122 allows data to be backed-up onto the back-up storage media 126. As illustrated in FIG. 3, the switching network 132 may further include one or more Ethernet switches 130a, 130b that are coupled to the storage system controller 122 via Ethernet port adapters 125a, 125b. In one example, the storage system controller 122 further includes another Ethernet port adapter 125c that may be coupled to, for example, a LAN 103 to enable the storage system 170 to communicate with host computes (e.g., user computers), as discussed below.

In the example illustrated in FIG. 3, the storage system controller 122 is coupled to the back-up storage media 126 via a switching network that includes two Fibre Channel switches and two Ethernet switches. Provision of at least two of each type of switch within the storage system 170 eliminates any single points of failure in the system. In other words, even if one switch (for example, Fibre Channel switch 128a) were to fail, the storage system controller 122 would still be able to communicate with the back-up storage media 126 via another switch. Such an arrangement may be advantageous in terms of reliability and speed. For example, as discussed above, reliability is improved through provision of redundant components and elimination of single points of failure. In addition, in some embodiments, the storage system controller is able to back-up data onto the back-up storage media 126 using some or all of the Fibre Channel switches in parallel, thereby increasing the overall back-up speed. However, it is to be appreciated that there is no requirement that the system comprise two or more of each type of switch, nor that the switching network comprise both Fibre Channel and Ethernet switches. Furthermore, in examples wherein the back-up storage media 126 comprises a single disk array, no switches at all may be necessary.

As discussed above, in one embodiment, the back-up storage media 126 may include one or more disk arrays. In one preferred embodiment, the back-up storage media 126 include a plurality of ATA or SATA disks. Such disks are "off the shelf" products and may be relatively inexpensive compared to conventional storage array products from manufacturers such as EMC, IBM, etc. Moreover, when one factors in the cost of removable media (e.g., tapes) and the fact that such media have a limited lifetime, such disks are comparable in cost to conventional tape-based back-up storage systems. In addition, such disks can read/write data substantially faster than can tapes. For example, over a single Fibre Channel connection, data can be backed-up onto a disk at a speed of at least about 150 MB/s, which translates to about 540 GB/hr, significantly faster (e.g., by an order of magnitude) than tape back-up speeds. In addition, several Fibre Channel connections may be implemented in parallel, thereby increasing the speed even further. In accordance with an embodiment of the present invention, back-up storage media may be organized to implement any one of a number of RAID (Redundant Array of Independent Disks) schemes. For example, in one embodiment, the back-up storage media may implement a RAID-5 implementation.

As discussed above, embodiments of the invention emulate a conventional tape library back-up system using disk arrays to replace tape cartridges as the physical back-up storage media, thereby providing a "virtual tape library." Physical tape cartridges that would be present in a conventional tape library are replaced by what is termed herein as "virtual cartridges." It is to be appreciated that for the purposes of this disclosure, the term "virtual tape library" refers to an emulated tape library which may be implemented in software and/or physical hardware as, for example, one or more disk array(s). It is further to be appreciated that although this discussion refers primarily to emulated tapes, the storage system may also emulate other storage media, for example, a CD-ROM or DVD-ROM, and that the term "virtual cartridge" refers generally to emulated storage media, for example, an emulated tape or emulated CD. In one embodiment, the virtual cartridge in fact corresponds to one or more hard disks.

Therefore, in one embodiment, a software interface is provided to emulate the tape library such that, to the back-up/restore application, it appears that the data is being backed-up onto tape. However, the actual tape library is replaced by one or more disk arrays such that the data is in fact being backed-up onto these disk array(s). It is to be appreciated that other types of removable media storage systems may be emulated and the invention is not limited to the emulation of tape library storage systems. The following discussion will now explain various aspects, features and operation of the software included in the storage system 170.

It is to be appreciated that although the software may be described as being "included" in the storage system 170, and may be executed by the processor 127 of the storage system controller 122 (see FIG. 3), there is no requirement that all the software be executed on the storage system controller 122. The software programs such as the synthetic full back-up application and the end-user restore application may be executed on the host computers and/or user computers and portions thereof may be distributed across all or some of the storage system controller, the host computer(s), and the user computer(s). Thus, it is to be appreciated that there is no requirement that the storage system controller be a contained physical entity such as a computer. The storage system 170 may communicate with software that is resident on a host computer such as, for example, the media server(s) 114 or application servers 102. In addition, the storage system may contain several software applications that may be run or resident on the same or different host computers. Moreover, it is to be appreciated that the storage system 170 is not limited to a discrete piece of equipment, although in some embodiments, the storage system 170 may be embodied as a discrete piece of equipment. In one example, the storage system 170 may be provided as a self-contained unit that acts as a "plug and play" (i.e., no modification need be made to existing back-up procedures and policies) replacement for conventional tape library back-up systems. Such a storage system unit may also be used in a networked computing environment that includes a conventional back-up system to provide redundancy or additional storage capacity. In another embodiment, the storage system 116 may be implemented in a distributed computing environment, such as a clustered or a grid environment.

As discussed above, according to one embodiment, the host computer 120 (which may be, for example, an application server 102 or media server 114, see FIG. 1) may back-up data onto the back-up storage media 126 via the network link (e.g., a Fibre Channel link) 121 that couples the host computer 120 to the storage system 170. It is to be appreciated that although the following discussion will refer primarily to the back-up of data onto the emulated media, the principles apply also to restoring back-up data from the emulated media. The flow of data between the host computer 120 and the emulated media 134 may be controlled by the back-up/restore application, as discussed above. From the view point of the back-up/restore application, it may appear that the data is actually being backed-up onto a physical version of the emulated media.

Figure 4:
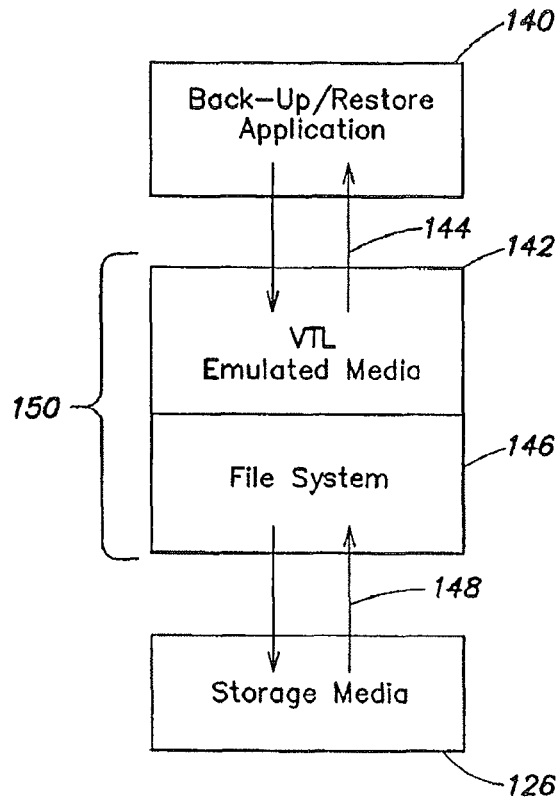
FIG. 4 is a block diagram illustrating a virtual layout of one embodiment of a storage system according to aspects of the invention.

Referring to FIG. 4, the storage system software 150 may include one or more logical abstraction layer(s) that represent the emulated media and provide an interface between a back-up/restore application 140 resident on the host computer 120 and the back-up storage media 126. The software 150 accepts tape format data from the back-up/restore application 140 and translates that data into data suitable for storage on random-access disks (e.g., hard disks, optical disks and the like). In one example, this software 150 is executed on the processor 127 of the storage system controller 122 and may be stored in memory 129 (see FIG. 3).

According to one embodiment, the software 150 may include a layer, referred to herein as the virtual tape library (VTL) layer 142 that may provide a SCSI emulation of tapes, tape drives, and also the robotic mechanisms used to transfer tapes to and from the tape drives. The back-up/restore application 140 may communicate (e.g., back-up or write data to the emulated media) with the VTL 142 using, for example, SCSI commands, represented by arrows 144. Thus, the VTL may form a software interface between the other storage system software and hardware and the back-up/restore application, presenting the emulated storage media 134 (FIG. 2) to a back-up/restore application and allowing the emulated media to appear to the back-up/restore application as conventional removable back-up storage media.

A second software layer referred to herein as the file system layer 146 may provide an interface between the emulated storage media (represented in the VTL) and the physical back-up storage media 126. In one example, the file system, 146 acts as a mini operating system to communicate with the back-up storage media 126 using, for example, SCSI commands, represented by arrows 148, to read and write data to and from the back-up storage media 126.

In one embodiment, the VTL provides generic tape library support and may support any SCSI media changer. Emulated tape devices may include, but are not limited to, an IBM LTO-1 and LTO-2 tape device, a QUANTUM SuperDLT320 tape device, a QUANTUM P3000 tape library system, or a STORAGETEK L180 tape library system. Within the VTL, each virtual cartridge is a file that may grow dynamically as data is stored. This is in contrast to conventional tape cartridges which have a fixed size. One or more virtual cartridges may be stored in a system file as described further below with respect to FIG. 5.

Figure 5:
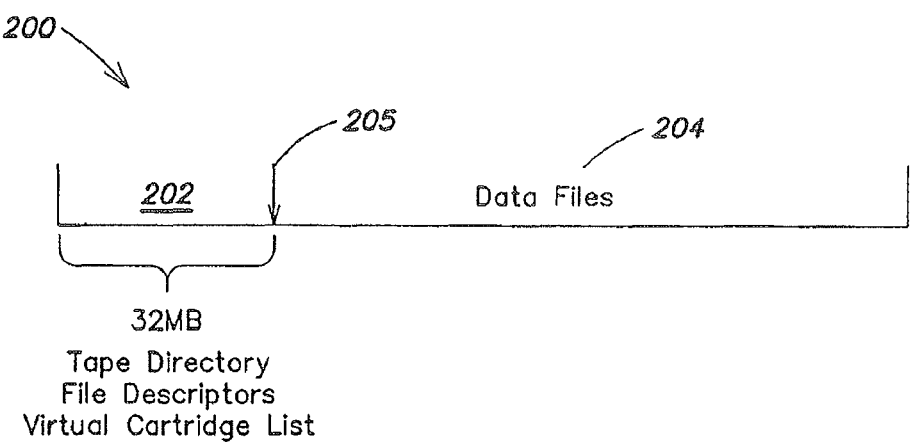
FIG. 5 is a schematic layout of one example of a system file according to aspects of the invention.

FIG. 5 illustrates one example of a data structure within the file system software 146 that illustrates a system file 200 in accordance with an embodiment of the present invention. In this embodiment, the system file 200 includes a header 202 and data 204. The header 202 may include information that identifies each of the virtual cartridges that are stored in that system file. The header may also contain information such as, whether a virtual cartridge is write protected, the dates of creation/modification of the virtual cartridges, etc. In one example, the header 202 includes information uniquely identifying each virtual cartridge and distinguishing each virtual cartridge from other virtual cartridges stored in the storage system. For example, this information may include a name and an identifying number (corresponding to a barcode that would typically be present on a physical tape so that the tape could be identified by the robotic mechanism) of the virtual cartridge. The header 202 may also contain additional information such as a capacity of each of the virtual cartridges, a date of last modification, etc.

According to one embodiment of the present invention, the size of the header 202 may be optimized to reflect the type of data being stored (e.g., virtual cartridges representing data back-up from one or more host computer systems) and the number of distinct sets of such data (e.g., virtual cartridges) that the system can track. For example, data that is typically backed-up to a tape storage system is typically characterized by larger data sets representing numerous system and user files. Because the data sets are so large, the number of discrete data files to be tracked may be correspondingly small. Accordingly, in one embodiment, the size of the header 202 may selected based on a compromise between storing too much data to efficiently keep track of (i.e., the header being too big) and not having space to store a sufficient number of cartridge identifiers (i.e., header being too small). In one exemplary embodiment, the header 202 utilizes the first 32 MB of the system file 200. However it is to be appreciated that the header 202 may have a different size based on system needs and characteristics and that, depending on system needs and capacity, one may select a different size for the header 202.

It is to be appreciated that, from the point of view of the back-up/restore application, the virtual cartridges appear as physical tape cartridges with all the same attributes and features. That is, to the back-up restore application, the virtual cartridges appear as sequentially written tapes. However, in one preferred embodiment, the data stored in the virtual cartridges is not stored in a sequential format on back-up storage media 126. Rather, the data that appears to be written to the virtual cartridges is in fact stored in the storage system's files as randomly accessible, disk-format data. Metadata is used to link the stored data to virtual cartridges so that the back-up/restore application can read and write data in cartridge format.

Thus, in broad overview of one preferred embodiment, user and/or system data (referred to herein as "file data") is received by the storage system 170 from the host computer 120 and is stored on the disk array(s) making up the back-up storage media 126. The software 150 (see FIG. 4) and/or hardware of the storage system writes this file data to the back-up storage media 126 in the form of system files, as is described in more detail below. Metadata is extracted as the data file is being backed-up by the storage system controller to keep track of attributes of the user and/or system files that are backed-up. For example, such metadata for each file may include the file name, a date of creation or last modification of the file, any encryption information relating to the file, and other information. In addition, metadata may be created by the storage system for each file that links the file to a virtual cartridge. Using such metadata, the software provides to the host computer an emulation of tape cartridges; however the file data is in fact not stored in tape format, but rather in the system files, as discussed below. Storing the data in system files, rather than in sequential cartridge format, may be advantageous in that it allows fast, efficient and random access to individual files without the need to scan through sequential data to find a particular file.

As discussed above, according to one embodiment, file data (i.e., user and/or system data) is stored on the back-up storage media as system files, each system file including a header and data, the data being the actual user and/or system files. The header 202 of each system file 200 includes a tape directory 206 that contains metadata linking the user and/or system files to virtual cartridges. The term "metadata" as used herein refers not to user or system file data, but to data that describes attributes of actual user and/or system data. According to one example, the tape directory may define, down to the byte level, the layout of data on the virtual cartridges.

In one embodiment, the tape directory 206 has a table structure, as illustrated in FIG. 6. The table includes a column 220 for the type of information stored (e.g., data, a file marker (FM), etc.), a column 222 for the size of the disk blocks used in bytes, and a column 224 that counts the number of disk blocks in which the file data is stored. Thus, the tape directory allows the controller to have random (as opposed to sequential) access to any data file stored on back-up storage media 126. For example, referring to FIG. 6, the data file 226 may be quickly located on the virtual tape because the tape directory indicates that the data of file 226 begins one block from the beginning of the system file 200. This one block has no size because it corresponds to a file marker (FM). File markers are not stored in the system file, i.e., file markers correspond to zero data. The tape directory includes file markers because they are used by conventional tapes and the back-up/restore application thus writes file markers along with data files and expects to see file markers when viewing a virtual cartridge. Therefore, file markers are kept track of in the tape directory. However, file markers do not represent any data and are therefore not stored in the data section of the system file. Thus, the data of file 226 begins at the beginning of the data section of the system file, indicated by arrow 205 (see FIG. 5), and is 1024 bytes in length (i.e., one disk block that is 1024 bytes in size). It should be appreciated that other file data may be stored in a block size other than 1024 bytes, depending on the amount of data, i.e., the size of the data file. For example, larger data files may be stored using larger disk block sizes for efficiency.

In one example, the tape directory may be contained in a "file descriptor" that is associated with each data file backed-up onto the storage system. The file descriptor contains metadata relating the data files 204 stored on the storage system. In one embodiment, the file descriptor may be implemented in accordance with a standardized format, such as the tape archive (tar) format used by most UNIX based systems. Each file descriptor may include information such as the name of the corresponding user file, the date the user file was created/modified, the size of the user file, any access restrictions on the user file, etc. Additional information stored in the file descriptor may further include information describing the directory structure from which the data was copied. Thus, the file descriptor may contain searchable metadata about a corresponding data file, as is discussed in more detail below.

From the point of view of the back-up/restore application, any virtual cartridge may contain a plurality of data files and corresponding file descriptors. From the point of view of the storage system software, the data files are stored in system files that may be linked to, for example, a particular back-up job. For example, a back-up executed by one host computer at a particular time may generate one system file that may correspond to one or more virtual cartridges. Virtual cartridges may thus be of any size and may grow dynamically as more user files are stored on the virtual cartridges.

Referring again to FIG. 2, as discussed above, the storage system 170 may include a synthetic full back-up software application 240. In one embodiment, the host computer 120 backs-up data onto the emulated media 134, forming one or more virtual cartridges. In some computing environments, a "full back-up," i.e., a back-up copy of all data stored on the primary storage system in the network (see FIG. 1), may be accomplished periodically (e.g., weekly). This process is typically very lengthy due the large amount of data that is to be copied. Therefore, in many computing environments, additional back-ups, termed incremental back-ups, may be performed between consecutive full back-ups, e.g., daily. An incremental back-up is a process whereby only data that has changed since the last back-up was executed (whether incremental or full) is backed-up. Typically, this changed data is backed-up on a file basis, even though frequently much of the data in the file has not changed. Thus, incremental back-ups are typically much smaller, and therefore much faster to accomplish, than are full back-ups. It is to be appreciated that although many environments typically execute full back-ups once a week and incremental back-ups daily during the week, there is no requirement that such time frames are used. For example, certain environments may require incremental back-ups several times a day. The principles of the invention apply to any environment using full back-ups (and optionally incremental back-ups), regardless of how often they are executed.

During a full back-up procedure, the host computer may create one or more virtual cartridges containing the back-up data that comprises a plurality of data files. For clarity, the following discussion will assume that the full back-up generates only one virtual cartridge. However, it is to be appreciated that a full back-up may generate more than one virtual cartridge, and that the principles of the invention apply to any number of virtual cartridges.

According to one embodiment, there is provided a method for creating a synthetic full back-up data set from one existing full back-up data set and one or more incremental back-up data sets. This method may obviate the need to perform periodic (e.g., weekly) full back-ups, thereby saving the user considerable time and network resources. Furthermore, as known to those of skill in the art, restoring data based on a full back-up and one or more incremental back-ups can be a time consuming process because, for example, if the most recent version of a file exists in an incremental back-up, the back-up/restore application will typically restore the file based on the last full back-up and then apply any changes from the incremental back-ups. Providing a synthetic full back-up, therefore, may have an additional advantage of allowing the back-up restore application to more quickly restore data files based on the synthetic full back-up alone, without the need to perform multiple restores from a full back-up and one or more incremental back-ups. It is to be appreciated that the phrase "most recent version" as used herein refers generally to the most recent copy of a data file (i.e., the most recent time that the data file was saved), whether or not the file has a new version number. The term "version" is used generally herein to refer to copies of the same file which may be modified in some way or may have been saved multiple times.

Figure 7:
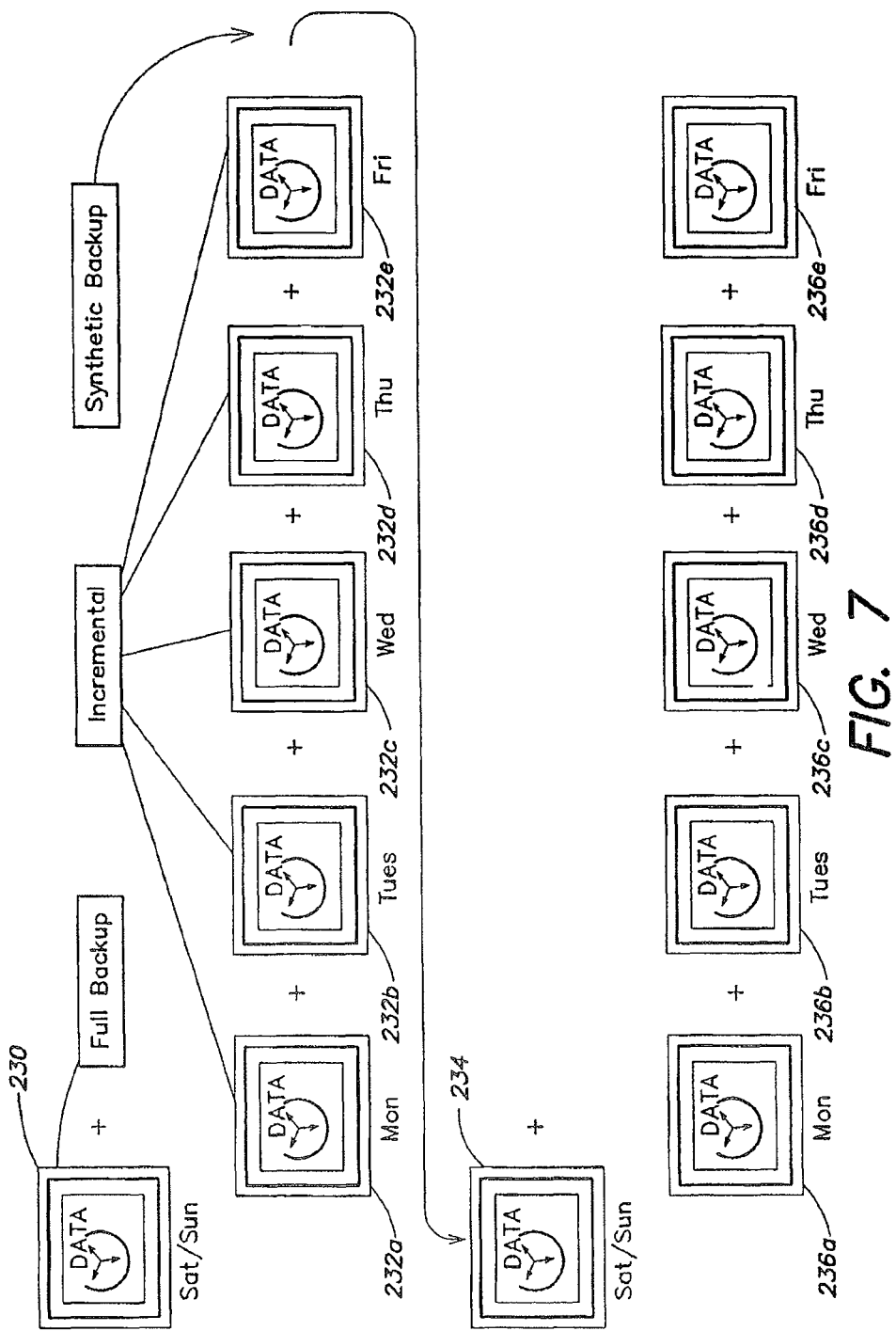
FIG. 7 is a diagram depicting one example of a method of creating a synthetic full back-up according to aspects of the invention.

Referring to FIG. 7, there is illustrated a schematic representation of a synthetic full back-up procedure. The host computer 120 may execute a full back-up 230 at a first moment in time, for example, on a weekend. The host computer 120 may then execute subsequent incremental back-ups 232*a*, 232*b*, 232*c*, 232*d*, 232*e*, for example, on each day during the week. The storage system 170 may then create a synthetic full back-up data set 234, as discussed below.

According to one embodiment, the storage system 170 may include a software application referred to herein as a synthetic full back-up application 240 (see FIG. 3). The synthetic full back-up application 240 may be run on the storage system controller 122 (see FIG. 2) or may be run on the host computer 120. The synthetic full back-up application includes software commands and interfaces necessary for creating the synthetic full back-up data set 234. In one example, the synthetic full back-up application may perform a logical merge of metadata representations of each of the full back-up data set 230 and the incremental back-up data sets 232 to generate a new virtual cartridge that contains the synthetic full back-up data set 234.

Figure 8:
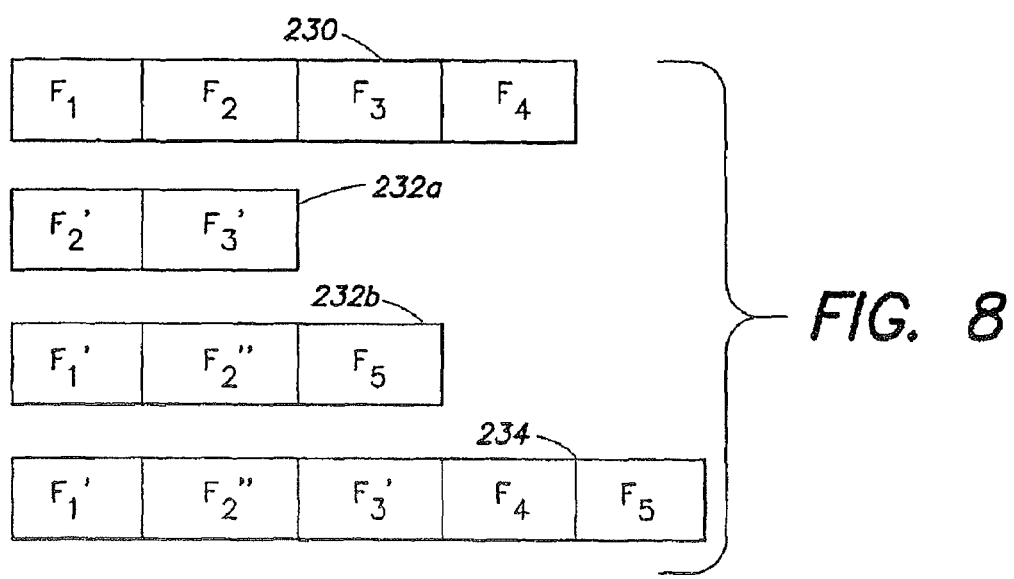
FIG. 8 is a schematic diagram of one example, of a series of back-up data sets including a synthetic full back-up according to aspects of the invention.

For example, referring to FIG. 8, the existing full back-up data set may include user files F1, F2, F3 and F4. A first incremental back-up data set 232*a* may include user files F2', a modified version of F2, and F3', a modified version of F3. A second incremental back-up data set 232*b* may include user files F1', a modified version of F1, and F2", a further modified version of F2, and a new user file F5. Therefore, the synthetic full back-up data set 234 formed from a logical merge of the full back-up data set 230 and the two incremental data sets 232*a* and 232*b*, contains the latest version of each of user files F1, F2, F3, F4 and F5. As seen in FIG. 8, the synthetic full back-up data set therefore contains user files F1', F2", F3', F4 and F5.

Referring again to FIGS. 3 and 4, the file system software 146 may create a logical metadata cache 242 that stores metadata relating to each user file stored on the emulated media 134. It is to be appreciated that the logical metadata cache is not required to be a physical data cache, but may instead be a searchable collection of data stored on the storage media 126. In another example, the logical metadata cache 242 can be implemented as a database. Where the metadata is stored in a database, conventional database commands (e.g., SQL commands) can be used to perform the logical merge of the full back-up data set and the one or more incremental back-up data sets to create the synthetic full back-up data set.

In another embodiment, a portion of the metadata may be stored in a database, and another portion may be stored in storage system files. For example, back-up data set metadata, including back-up data set name and data objects it comprises, may be included in the conventional database, while metadata specific to the data objects, such as, for example in the case where the data object is a data file, data file size, security information and location in primary storage may be included in storage system files. Storing metadata in this fashion enables flexible retrieval of frequently queried data from a conventional database and promotes system scalability by enabling faster storage of less frequently queried data in storage system files.

Figure 9:
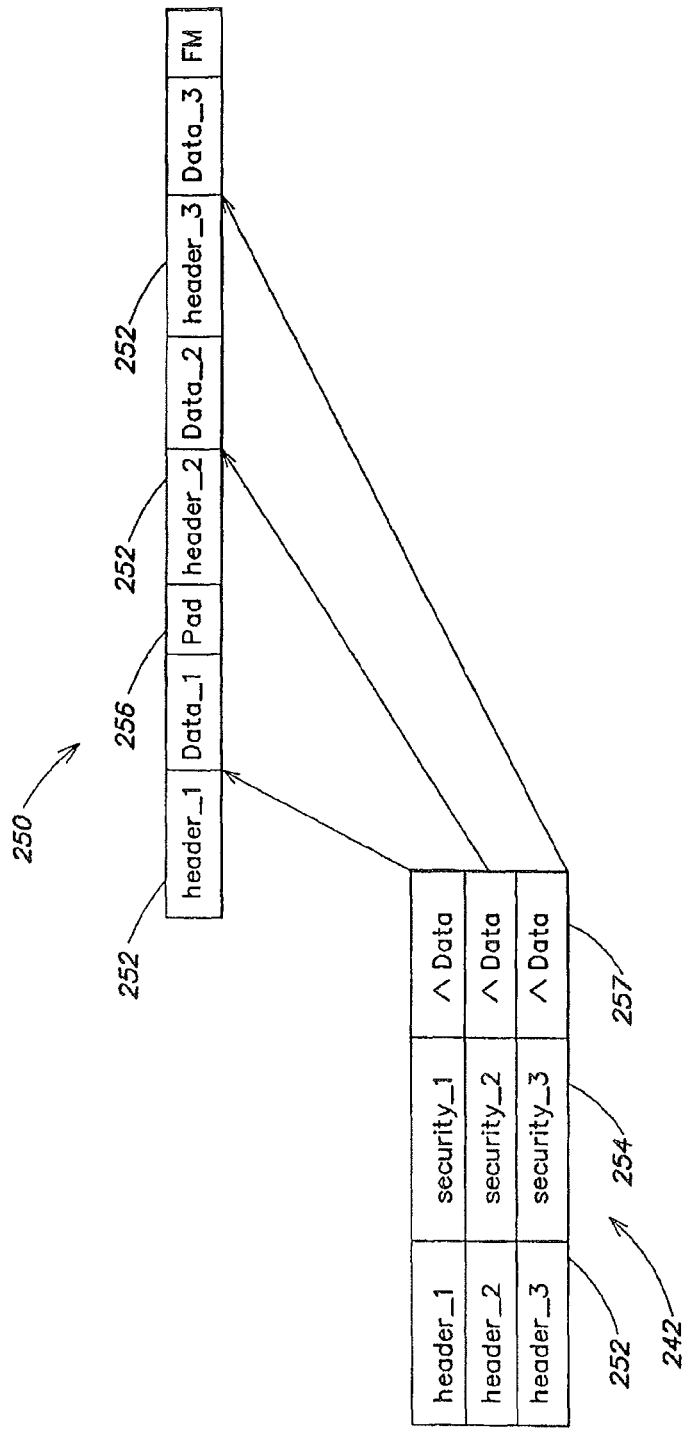
FIG. 9 is a diagram of one example, of a metadata cache structure.

As discussed above, each data file stored on the emulated media 134 may include a file descriptor that contains metadata relating to the data file, including a location of the file on the back-up storage media 126. In one embodiment, the back-up/restore application running on the host computer 120 stores data in a streaming tape format on the emulated media 134. An example of a data structure 250 representing this tape format is illustrated in FIG. 9. As discussed above, the system file data structure includes headers which may contain information about the data file(s), such as the file descriptor for the data files, the dates of creation and/or modification of the files, security information, the directory structure of the host system from whence the file(s) came, as well as other information linking the files to a virtual cartridge. These headers are associated with the data 254 which is actual user and system files that have been backed-up (copied) from the host computer, the primary storage system, etc. The system file data structure may also optionally include pads 256 which may appropriately align the next header to a block boundary.

As shown in FIG. 9, in one embodiment, the header data is located in the logical metadata cache 242 to permit rapid searching and random access to the otherwise sequential tape data format. The use of the logical metadata cache, implemented using the file system software 146 on the storage system controller 122, allows translation of the linear, sequential tape data format, stored on the emulated media 134, into the random-access data format stored on physical disks making up the back-up storage media 126. The logical metadata cache 242 stores the headers 252 which include the file descriptors for the data files, security information which may be used to control access to the data files, as is discussed in more detail below, and pointers 257 to the actual locations of the data files on the virtual cartridges and the back-up storage media 126. In one embodiment, the logical metadata cache stores data relating to all the data files backed-up in the full back-up data set 230 and each of the incremental data sets 232.

According to one embodiment, the synthetic full back-up application software 240 uses the information stored in the logical metadata cache to create a synthetic full back-up data set. This synthetic full back-up data set is then linked to a synthetic virtual cartridge, created by the synthetic full back-up application 240. To the back-up/restore application, the synthetic full back-up data set appears to be stored on this synthetic virtual cartridge. As discussed above, the synthetic full back-up data set may be created by performing a logical merge of the existing full back-up data set and the incremental back-up data sets. This logical merge may include comparing each of the data files included in each of the existing full back-up data set and the incremental back-up data sets and creating a composite of the latest-modified version of each user file, as discussed above in reference to FIG. 8.

Figure 10:
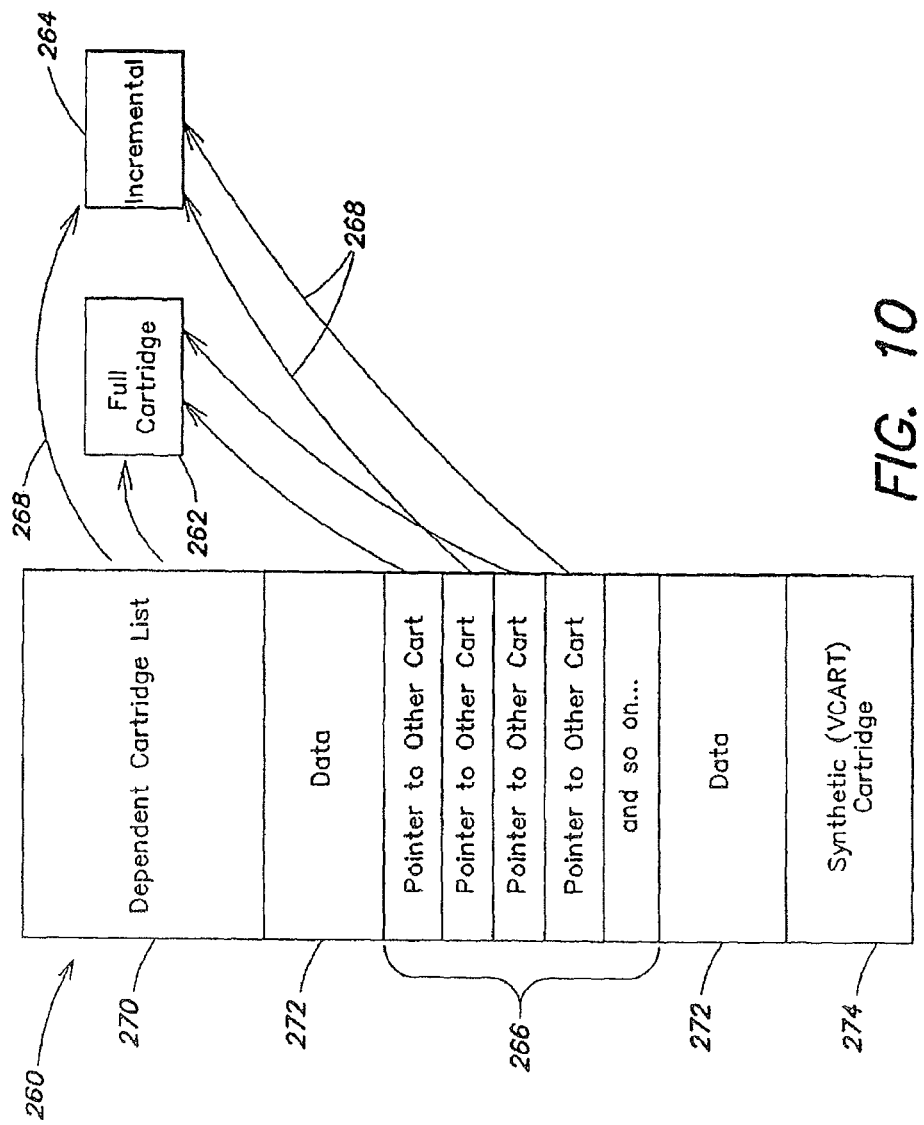
FIG. 10 is a diagram of one example of a virtual cartridge storing a synthetic full back-up data set.

According to one embodiment, the synthetic virtual cartridge 260 includes pointers that point to locations of data files on other virtual cartridges, specifically, the virtual cartridges that contain the existing full back-up data set and the incremental back-up data sets, as shown in FIG. 10. Considering the example given with respect to FIG. 8 above, the synthetic virtual cartridge 260 includes pointers 266 that point (indicated by arrows 268) to the locations in the existing full back-up data set, on virtual cartridge 262, of user file F4 (because the existing full back-up data set contained the latest version of F4) and to the location of, for example, user file F3' in incremental data set 232a on virtual cartridge 264.

The synthetic virtual cartridge also includes a list 270 that contains the identifying numbers (and optionally the names) of all the virtual cartridges that contain data to which the pointers 266 point. This dependent cartridge list 270 may be important for keeping track of where the actual data is and for preventing the dependent virtual cartridges from being erased. In this embodiment, the synthetic full back-up data set does not contain any actual user files, but rather a set of pointers that indicate the locations of the user files on the back-up storage media 126. Therefore, it may be desirable to prevent the actual user files (stored on other virtual cartridges) from being deleted. This may be accomplished in part by keeping a record (dependent cartridge list 270) of the virtual cartridges that contain the data and protecting each of those virtual cartridges from being over-written or deleted. The synthetic virtual cartridge may also include cartridge data 272 such as, the size of the synthetic virtual cartridge, its location on the back-up storage media 126, etc. In addition, the synthetic virtual cartridge may have an identifying number and/or name 274.

Figure 11:
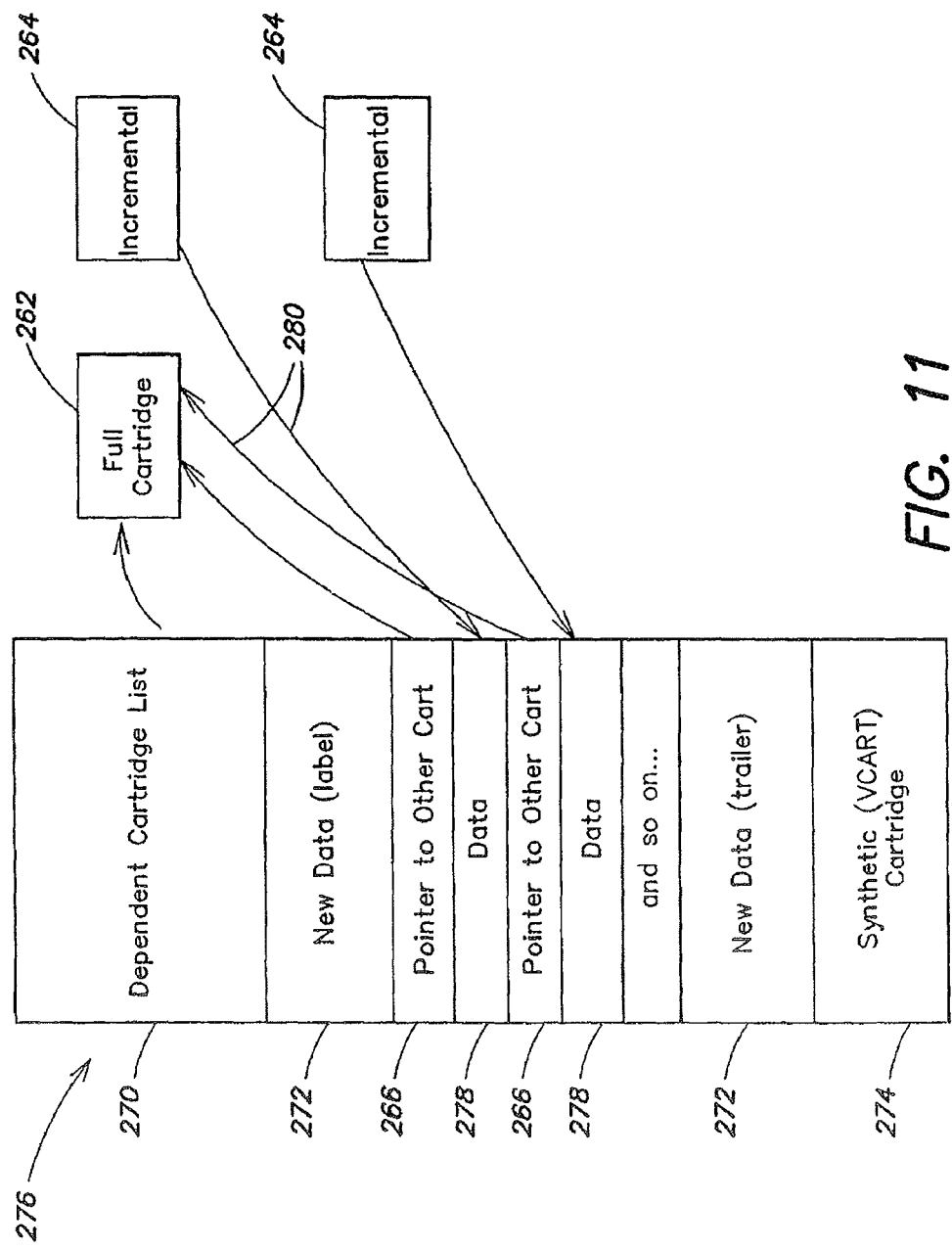
FIG. 11 is a diagram of another examples of a virtual cartridge storing a synthetic full back-up data set.

According to another embodiment, the synthetic virtual cartridge may include a combination of pointers and actual stored user files. Referring to FIG. 11, in one example, the synthetic virtual cartridge includes pointers 266 that point to locations of data files (the latest versions, as discussed above in reference to FIG. 9) in the existing full back-up data set 230 on virtual cartridge 262. The synthetic virtual cartridge may also include data 278 containing actual data files copied from the incremental data sets 232, as indicated by arrows 280. In this manner, the incremental back-up data sets can be deleted after the synthetic full back-up data set 276 has been created, thereby saving storage space. The synthetic virtual cartridges are relatively small as they contain all or partly pointers rather than copies of all the user files.

It is to be appreciated that synthetic full back-ups may include any combination of pointers and stored file data and are not limited to the examples given above. For example, synthetic full back-ups may include pointers to data files for some files stored on certain incremental and/or full back-ups and may include stored file data copied from other existing full and/or incremental back-ups. Alternatively still, a synthetic full back-up may be created based upon a prior full back-up and any relevant incremental back-ups that does not include any pointers, but rather includes the latest version of actual file data copied from the appropriate full and/or incremental back-ups.

In one embodiment, the synthetic full back-up application software may include a differencing algorithm that enables it to compare the user and system file metadata for each of the existing full back-up data set and the incremental back-up data sets to determine where the latest version of each of the data files is located. For example, a differencing algorithm could be used to compare the dates of creation and/or modification, the version number (if applicable), etc. between different versions of the same data files in the different back-up sets to select the most recent version of the data file. However, users may often open a user file and save the file (thereby changing its data of modification) without actually changing any of the data inside the file. Therefore, the system may implement a more advanced differencing algorithm that may analyze the data inside the system or user files to determine whether the data has in fact changed. Variations of such differencing algorithms and other types of compare algorithms may be known to those skilled in the art. In addition, as discussed above, where the metadata is stored in a database format, database commands such as SQL commands can also be used to perform the logical merge. The invention may apply any of such algorithms to ensure that the most recent or latest version of each user file may be selected from all compared existing back-up sets so as to properly create the synthetic full back-up data set.

As should be appreciated by those skilled in the art, the synthetic full back-up application enables full back-up data sets to be created and made available without requiring the host computer to execute a physical full back-up. Not only does this avoid burdening the host computer with the processor overhead of transferring the data to the back-up storage system, but in embodiments where the synthetic full back-up application is executed on the storage system, it significantly reduces the utilization of network bandwidth. As illustrated in FIG. 7, further synthetic full back-up data sets may be created using a first synthetic full back-up data set 234 and subsequent incremental back-up data sets 236. This may provide a significant time advantage in that files or objects that are not frequently modified may not be frequently copied. Instead, the synthetic full back-up data sets may maintain pointers to these files that have just been copied once.

Figure 12:
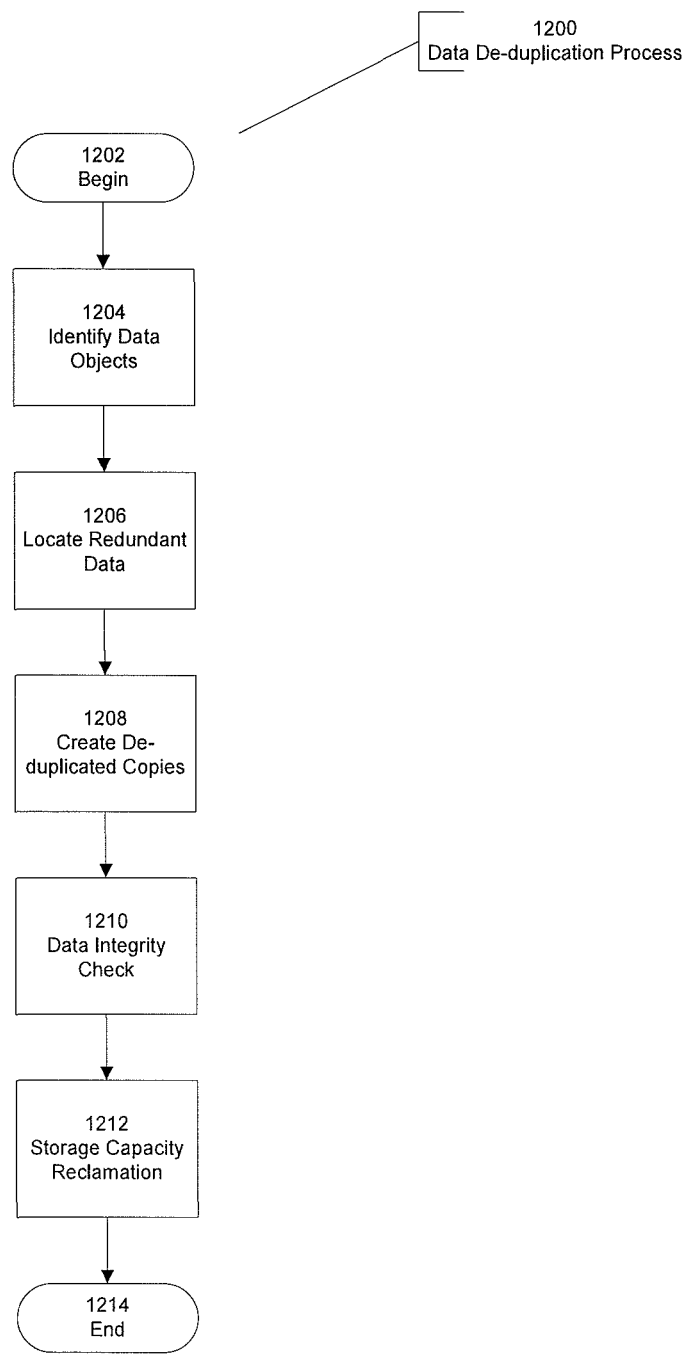
FIG. 12 is a flow diagram of a method of de-duplicating data objects in accordance with the present invention.

Embodiments of the present invention also include computer systems executing processes for removing redundant data from data objects. Such removal of redundant data is known in the art as "de-duplicating" data. FIG. 12 illustrates an example process 1200 for de-duplicating data from a data object according to one embodiment of the present invention. This process may be implemented using a single back-up storage system or within a distributed storage system environment, such as a grid environment as discussed above.

In general, a system conducting the process 1200 may cull through metadata associated with a series of data objects to identify those data objects that will be subject to further de-duplication process steps, such as, for example, data objects that are likely to share duplicate data. The system may inspect the data objects identified for additional processing to locate any redundant data. Further, the system may construct copies of the identified data objects that point to a single copy of the redundant data and, optionally, validate the integrity of these copies. To reclaim storage capacity occupied by redundant data, the system may delete the originally identified data objects. More details regarding the specific acts included in this process are discussed below.

Still referring to FIG. 12, at step 1202, the data de-duplication process 1200 begins. At step 1204, a system identifies data objects that will subject to further de-duplication processing. In one embodiment, the system may identify data objects that are likely to contain redundant data. Various methods and metadata may be employed to make this identification. For example, in one embodiment the physical location of a back-up data object in primary storage may indicate that it is likely to have data with another back-up data object. More particularly, if two back-up data objects originated from the same primary storage device, e.g. a particular server, then the data objects may be identified as likely including copies of redundant data. Similarly, in another embodiment, two data objects may be identified as likely to have redundant data if both were created by a particular software application. In still another embodiment, whether data objects were stored as part of a full or incremental back-up policy may indicate a likelihood of redundant data. Identification of data objects that are likely to contain duplicate data increases the overall efficiency of the process 1200 by enabling scarce computer resources, such as CPU cycles, to be focused on those data objects that will most benefit from removal of redundant data.

In another embodiment, a system may be configured to automatically include certain data objects in, or exclude certain data objects from, further de-duplication processing based on metadata associated with these data objects. For instance, a system may be configured to include data objects created by a particular software application in de-duplication processing. Likewise, a system may be configured to include data objects backed-up as part of a particular policy in further de-duplication processing. Conversely, the system may be configured to exclude all data objects backed-up by a particular policy and/or specifically name data objects from further de-duplication processing. These configuration options enable system behavior to be tailored to suit the particular needs of any client environment, thus promoting system performance and scalability.

At step 1206, the system conducting the process 1200 locates redundant data in the data objects that were identified for further de-duplication processing. This analysis may be accomplished by using metadata and/or by inspecting the actual contents of the identified data objects. In one embodiment, data objects with similar metadata are assumed to comprise the same data. For instance, if the data objects are data files and both share the same name, physical location in primary storage and CRC, hash or some other metadata generated during de-duplication processing, then the two data objects may be recorded as being redundant. Using metadata to identify redundant data provides several advantages. Using metadata promotes efficiency because only the metadata of the data objects rather than the entirety of the data objects may be processed.

In another embodiment, data objects may be compared on a bit by bit basis to guarantee redundancy before being so recorded. While this type of comparison may be computing resource intensive, it also provides strong assurance that any data identified as redundant is, in fact, completely redundant. This approach to determining redundancy may be useful, for example, when handling data objects whose integrity is particularly important, such as financial information.

In still another embodiment, some portion of the data included in the data object is analyzed to establish redundancy of the entire object. For example, certain software applications may relegate modified data to certain locations within data objects that they modify, e.g. at the beginning or the end of the object. Thus, using this data distribution pattern, the system may focus its de-duplication processing on those portions of the data object that are more likely to be static, thus increase system efficiency.

Embodiments of the present invention may employ a combination of these techniques to locate redundant data. More specifically, a system may direct particular techniques to particular data objects based on metadata such as that used to identify the data objects for further de-duplication processing above. This metadata may include, among others, location in primary storage, policy that caused the data object to be backed-up and software application associated with the data objects. As with data object identification, the ability to tune the system with respect to manner of locating duplicate data promotes system scalability and performance.

At step 1208, a system executing the process 1200 may create de-duplicated copies of previously identified data objects that include redundant data. These de-duplicated copies may include little or no redundant data. In one embodiment, the identified data objects may include, for example, virtual cartridges. In this instance, the system may create one or more de-duplicated virtual cartridges that, when fully resolved, include all of the data included in the identified virtual cartridges. As with the synthetic virtual cartridges discussed above, these de-duplicated virtual cartridges may comprise both data objects and pointers to data objects.

During the creation of these de-duplicated data copies, the system may store copies of duplicated data within a particular data object and create and/or modify pointers within other data objects to store the duplicated data within those data objects. The system may follow various methodologies when storing the duplicated data and the pointers. In one embodiment, the duplicated data is housed in the oldest data object, and pointers identifying the location of the duplicated data are stored in younger data objects including the duplicated data. This technique, referred to in the art as backward referencing, is common where hashing indexes are built to summarize data objects for de-duplication processing.

In another embodiment, the duplicated data is housed in the youngest data object, and pointers identifying the location of the duplicated data are stored in older data objects including the duplicated data. This technique may be termed forward referencing. Forward referencing increases data restoration performance where data is restored from the last back-up because reduced dereferencing of pointers is required to resolve all the data contained in the back-up data object. This increased performance is particularly beneficial due to the fact that the most recent, i.e. youngest, back-up is usually used when data must be restored to primary storage.

FIGS. 13A, 13B and 13C illustrate both forward and backward referencing as described above. FIG. 13A shows the back-up data objects 1302 and 1304 prior to de-duplication processing. For purposes of this illustration, please assume the back-up data object 1302 was stored prior to the back-up data object 1304. The back-up data object 1302 includes a unique data portion 1306 and a redundant data portion 1310A. The back-up data object 1304 includes a unique data portion 1308 and a redundant data portion 1310B.

FIG. 13B illustrates de-duplicated copies of the data objects 1302 and 1304 under a forward referencing scheme. The data object 1304, which is the more recently stored of the two, includes a copy of the redundant data portion 1310B. The data object 1302, which is the less recently stored of the two, includes a pointer 1312 which points to the redundant data portion 1310B. Thus, after the de-duplicated copies are created, the younger data object includes a copy of the redundant data, and the older data object includes a pointer to the redundant data in the younger data object.

FIG. 13C illustrates de-duplicated copies of the data objects 1302 and 1304 under a backward referencing scheme. The data object 1302, which is the less recently stored of the two, includes a copy of the redundant data 1310A. The data object 1302, which is the more recently stored of the two, includes a pointer 1312 which points to the redundant data portion 1310A. Thus, after the de-duplicated copies are created, the older data object includes a copy of the redundant data, and the younger data object includes a pointer to the redundant data in the older data object.

At step 1210, the system may compare the de-duplicated copies against the previously identified data objects to ensure data integrity has been preserved. This comparison may require dereferencing of data object pointers and may include a bit by bit comparison of the data included in the data objects. After this integrity check is performed, in one embodiment, the system may swap the pointers that identify the de-duplicated copies and their respective previously identified data objects so that the de-duplicated data object becomes the primary data object and the previously identified data object may be deleted without disrupting the integrity of any data objects that reference it. The system may also make other adjustments to metadata to ensure it accurately reflects the characteristics of the de-duplicated copy.

At step 1212, the storage capacity utilized by the previously identified data objects is reclaimed for use by other data objects. In one embodiment, this may be accomplished by simply deleting the previously identified data objects. At step 1214, process 1200 ends.

The process 1200 depicts a preferable sequence of events. Other actions can be added, or the order of actions can be altered in the process 1200 without departing from the spirit of the present invention. In one embodiment, the process 1200 may be executed for each data object included in a back-up storage system. In another embodiment, a system may execute the process 1200 for a subset of the data objects in the back-up storage system.

The process 1200 may be executed on demand or scheduled as a one-time or reoccurring process. Further subsets of the process 1200 may be executed when the space reclaimed by de-duplication will meet or exceed a certain threshold. For example, in one embodiment the process 1200 may execute only when de-duplication will free at least a specified number (e.g., 50) terabytes or a specified percentage (e.g., 25%) the utilized back-up storage capacity. When implemented as event driven computing actions, the acts that comprise process 1200 may be executed in a distributed computing environment, such as a grid environment.

Thus, in summary, embodiments of the de-duplication process 1200 may decrease the storage capacity required to maintain copies of back-up data and thus, decrease the amount of electronic media required to store back-up data. Further, embodiments of the de-duplication process 1200 may make efficient use of computing resources by using metadata to optimize de-duplication processing. Finally, by storing de-duplicated data in a forward referencing scheme, de-duplication can enhance the performance of commonly used data restoration functionality.

As discussed above in reference to FIG. 3, the storage system may also include a software application referred to as the end-user restore application 300. Thus, according to another embodiment, there is provided a method for end users to locate and restore back-up data without IT staff intervention and without requiring any changes to existing back-up/restore procedures and/or policies. In a typical back-up storage system, the back-up/restore application running on the host computer 120 is controlled by IT staff and it may be impossible or very difficult for an end-user to access back-up data without intervention by the IT staff. According to aspects and embodiments of the invention, storage system software is provided that allows end users to locate and restore their files via, for example, a web-based or other interface with the back-up storage media 126.

It is to be appreciated that, as with the synthetic full back-up application 240, the end-user restore application 300 may be run on the storage system controller 122 (see FIG. 2) or may be run on the host computer 120. The end-user restore application includes software commands and interfaces necessary to allow an authorized user to search the logical metadata cache to locate, an optionally restore, back-up files from the back-up storage media 126.

According to one embodiment, there is provided software including a user interface that is installed and/or executed on the user computer 136. The user interface may be any type of interface that allows a user to locate files on the back-up storage media. For example, the user interface may be a graphical user interface, may be web-based, or may be a text interface. The user computer is coupled to the storage system 170 via a network connection 138 which may be, for example, an Ethernet connection. Through this network connection 138, an operator of the user computer 136 can access the data stored on the storage system 170.

In one example, the end-user restore application 300 includes a user authentication and/or authorization feature. For example, a user may be asked to login via the user interface on the user computer using a username and password. The user computer may communicate the username and password to the storage system (e.g., to the end-user restore application) which may use an appropriate user authentication mechanism to determine whether the user has access to the storage system. Some examples of user authentication mechanisms that may be used include, but are not limited to, a MICROSOFT Active Directory server, a UNIX "yellow pages" server or a Lightweight Directory Access Protocol. The login/user authentication mechanism may communicate with the end-user restore application to exchange the user privileges. For example, some users may be allowed to search only those files that have been created by themselves or for which they have certain privileges or are identified as an owner. Other users such as, for example, system operators or administrators may be allowed access to all back-up files, etc.

According to one embodiment, the end-user restore application uses the logical metadata cache to obtain information about all the data files backed-up on the back-up storage media. The end-user restore application presents to the user, via the user interface, a hierarchical directory structure of the user's files sorted by, for example, back-up time/date, username, original user computer directory structure (that may have been obtained when the files were backed-up), or other file characteristics. In one example, the directory structure presented to the user may vary according to the privileges enabled for that user. The end-user restore application may accept browse requests (i.e., through the user interface, the user may browse the directory structure to locate a desired file) or the user may search for a file by name, date, etc.

According to one embodiment, the user may restore back-up files from the storage system. For example, once the user has located a desired file, as described above, the user may download the file from the storage system via the network connection 138. In one example, this download procedure may be implemented in a manner comparable to any web-based download, as known to those skilled in the art.

By allowing end users to access those files for which they have permission to view/download, and by enabling such access through a user interface (e.g., web-based technology), the end-user restore application can enable user to search for and restore their own files without there being any need to alter any back-up policies or procedures.

It should be appreciated that although aspects of the present invention, such as the synthetic full back-up application and the end-user restore application are described herein primarily in terms of software, it should be appreciated that they may alternatively be implemented in software, hardware or firmware, or any combination thereof. Thus, for example, embodiments of the present invention may comprise any computer-readable medium (e.g., a computer memory, a floppy disk, a compact disk, a tape, etc.) encoded with a computer program (i.e., a plurality of instructions), which, when executed, at least in part, on a processor of a storage system, performs the functions of the synthetic full back-up application and/or the end-user restore application as described in detail above.

In general summary, embodiments and aspects of the invention thus include a storage system and methods that emulate a conventional tape back-up system but may provide enhanced functionality such as being able to create synthetic back-ups and allowing end users to view and restore back-up files. However, it should be appreciated that various aspects of the present invention may be used for other than the back-up of computer data. Because the storage system of the present invention may be used to economically store vast amounts of data, and that stored data can be accessed randomly, as opposed to sequentially, and at hard disk access times, embodiments of the present invention may find use outside of traditional back-up storage systems. For example, embodiments of the present invention may be used to store video or audio data representing a wide selection of movies and music and enable video and/or audio on demand.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for removing redundant data from a backup storage system implementing a forward referencing scheme, the method comprising:
   storing, by a back-up application, a more recent back-up data object at a first physical location, the more recent back-up data object having been backed-up more recently than a less recent back-up data object that is distinct from the more recent back-up data object and that is stored at a second physical location different from the first physical location, the more recent back-up data object including a first redundant portion and a first unique portion, the less recent back-up data object including a second redundant portion and a second unique portion, the first unique portion including data different from the second unique portion;
   identifying the less recent back-up data object created by the back-up application, the less recent back-up data object having been backed-up less recently than the more recent back-up data object;
   detecting that the first redundant portion is a copy of the second redundant portion;
   replacing the second redundant portion with a pointer to the first redundant portion; and
   accessing, via the pointer to the first redundant portion by the back-up application, the more recent back-up data object at the first physical location.

2. The method according to claim 1, wherein replacing the second redundant portion with the pointer to the first redundant portion comprises:
   creating a copy of the less recent back-up data object excluding the second redundant portion and including a pointer to the first redundant portion; and
   deleting the less recent back-up data object.

3. The method according to claim 2, further comprising validating that the copy of the less recent back-up data object represents the same data as the less recent back-up data object.

4. The method according to claim 1, further comprising identifying at least one more recent characteristic of data object metadata;
   wherein storing the more recent back-up data object includes storing a more recent back-up data object associated with data object metadata having the at least one more recent characteristic; and
   wherein identifying the less recent back-up data object includes identifying a less recent back-up data object associated with data object metadata having the at least one more recent characteristic.

5. The method according to claim 4, wherein identifying the at least one more recent characteristic of data object metadata includes:
   identifying a location in primary storage associated with the more recent back-up data object; and
   identifying a location in primary storage associated with the less recent back-up data object.

6. The method according to claim 4, wherein identifying the at least one more recent characteristic of data object metadata includes:
   identifying a software application associated with the more recent back-up data object; and
   identifying a software application associated with the less recent back-up data object.

7. The method according to claim 4, wherein identifying the at least one more recent characteristic of data object metadata includes:
   identifying a back-up policy associated with the more recent back-up data object; and
   identifying a back-up policy associated with the less recent back-up data object.

8. The method according to claim 4, wherein identifying the at least one more recent characteristic of data object metadata includes:
   identifying at least one more recent characteristic of data object metadata that was stored while the more recent back-up data object was being backed-up; and
   identifying at least one more recent characteristic of data object metadata that was stored while the less recent back-up data object was being backed-up.

9. The method according to claim 1, wherein detecting the first redundant portion includes detecting a first redundant portion using metadata associated with the more recent back-up data object and metadata associated with the less recent back-up data object.

10. The method according to claim 9, wherein detecting the first redundant portion using metadata includes detecting a first redundant portion using metadata stored in a relational database.

11. The method according to claim 1, wherein storing the more recent back-up data object includes storing a more recent data file; and
   wherein identifying the less recent back-up data object includes identifying a less recent data file.

12. A computer-readable medium having computer-readable signals stored thereon that define instructions that, as a result of being executed by a computer, instruct the computer to perform the method of claim 1.

13. The method according to claim 1, wherein the method is executed in a grid computing environment.

14. The method according to claim 1, wherein the method is executed on a backup storage system while data is not being backed-up to the back-up storage system.

15. A method comprising:
   storing, by a back-up application, a more recent back-up data object at a first physical location, the more recent back-up data object being associated with a software application and having been backed-up more recently than a less recent back-up data object that is distinct from the more recent back-up data object and that is stored at a second physical location different from the first physical location, the more recent back-up data object including a first redundant portion and a first unique portion, the less recent back-up data object including a second redundant portion and a second unique portion, the first unique portion including data different from the second unique portion;
   identifying the less recent back-up data object created by the back-up application and associated with the software application, the less recent back-up data object having been backed-up less recently than the more recent back-up data object;
   detecting, using a pattern of data distribution associated with the software application, that the first redundant portion is a copy of the second redundant portion, the pattern of data distribution being located within the more recent back-up data object and the less recent data back-up object;
   replacing the second redundant portion with a pointer to the first redundant portion; and
   accessing, via the pointer to the first redundant portion by the back-up application, the more recent back-up data object at the first physical location.

16. A computer-readable medium having computer-readable signals stored thereon that define instructions that, as a result of being executed by a computer, instruct the computer to perform the method of claim 15.

17. A system comprising:
   back-up storage media storing a plurality of back-up data objects created by a back-up application and including a more recent back-up data object including more recent data and a less recent back-up data object that is distinct from the more recent back-up data object and that includes less recent data, the more recent back-up data object including a first redundant portion and a first unique portion, the less recent back-up data object including a second redundant portion and a second unique portion, the first unique portion including data different from the second unique portion; and
   a controller configured to:
      store the more recent back-up data object at a first physical location that is different from a second physical location at which the less recent back-up data object is stored;
      identify that the first redundant portion is a copy of the second redundant portion;
      replace the second redundant portion with a pointer to the first redundant portion; and
      access via the pointer to the first redundant portion the more recent back-up data object at the first physical location.

18. The system according to claim 17, wherein the controller is further configured to replace the second redundant portion by creating a copy of the less recent back-up data object excluding the second redundant portion and including a pointer to the first redundant portion.

19. The method according to claim 4, further comprising identifying at least one less recent characteristic of data object metadata;
   wherein storing the more recent back-up data object includes storing a third portion of the more recent back-up data object that is associated with data object metadata having the at least one less recent characteristic, the method further comprising excluding the third portion from additional processing.

20. The method according to claim 1, wherein detecting the first redundant portion includes selecting a technique for locating redundant data based on metadata associated with the more recent back-up data object.

21. The method according to claim 20, wherein selecting the technique for locating redundant data includes selecting a technique for locating redundant data that uses metadata associated with the more recent back-up data object.

22. The method according to claim 20, wherein selecting the technique for locating redundant data includes selecting a technique for locating redundant data that uses data included in the more recent back-up data object.

23. The system according to claim 17, wherein the more recent data is newer than the less recent data.

* * * * *